(12) United States Patent
Itou

(10) Patent No.: US 11,614,665 B2
(45) Date of Patent: Mar. 28, 2023

(54) DISPLAY DEVICE

(71) Applicant: Japan Display Inc., Tokyo (JP)

(72) Inventor: Osamu Itou, Tokyo (JP)

(73) Assignee: Japan Display Inc., Tokyo (JP)

( * ) Notice: Subject to any disclaimer, the term of this patent is extended or adjusted under 35 U.S.C. 154(b) by 52 days.

(21) Appl. No.: 17/159,404

(22) Filed: Jan. 27, 2021

(65) Prior Publication Data

US 2021/0247653 A1 Aug. 12, 2021

(30) Foreign Application Priority Data

Feb. 7, 2020 (JP) .............................. JP2020-019711

(51) Int. Cl.
*G02F 1/1343* (2006.01)
*G02F 1/1362* (2006.01)

(52) U.S. Cl.
CPC .. *G02F 1/136286* (2013.01); *G02F 1/134309* (2013.01); *G02F 1/136222* (2021.01); *G02F 1/136277* (2013.01)

(58) Field of Classification Search
CPC ......... G02F 1/136286; G02F 1/134309; G02F 1/136222; G02F 1/136277; G02F 1/134372
See application file for complete search history.

(56) References Cited

U.S. PATENT DOCUMENTS

| 6,411,346 B1* | 6/2002 | Numano ........... G02F 1/136213 349/39 |
| 2010/0201931 A1 | 8/2010 | Jang et al. |
| 2018/0323224 A1* | 11/2018 | Hung ................ G02F 1/133707 |

FOREIGN PATENT DOCUMENTS

JP 2010-181874 A 8/2010

* cited by examiner

*Primary Examiner* — James A Dudek
(74) *Attorney, Agent, or Firm* — Maier & Maier, PLLC

(57) ABSTRACT

According to one embodiment, a display device includes a first substrate, a second substrate opposed to the first substrate, and a liquid crystal layer provided between the first substrate and the second substrate. The first substrate includes a first signal line and a second signal line and being adjacent to each other in a first direction, a first scanning line and a second scanning line and being adjacent to each other in a second direction intersecting the first direction, a semiconductor layer connected to the first signal line and the first scanning line, a first transparent electrode in contact with the semiconductor layer, an organic insulating layer including a contact hole, and a second transparent electrode in contact with the first transparent electrode.

16 Claims, 21 Drawing Sheets

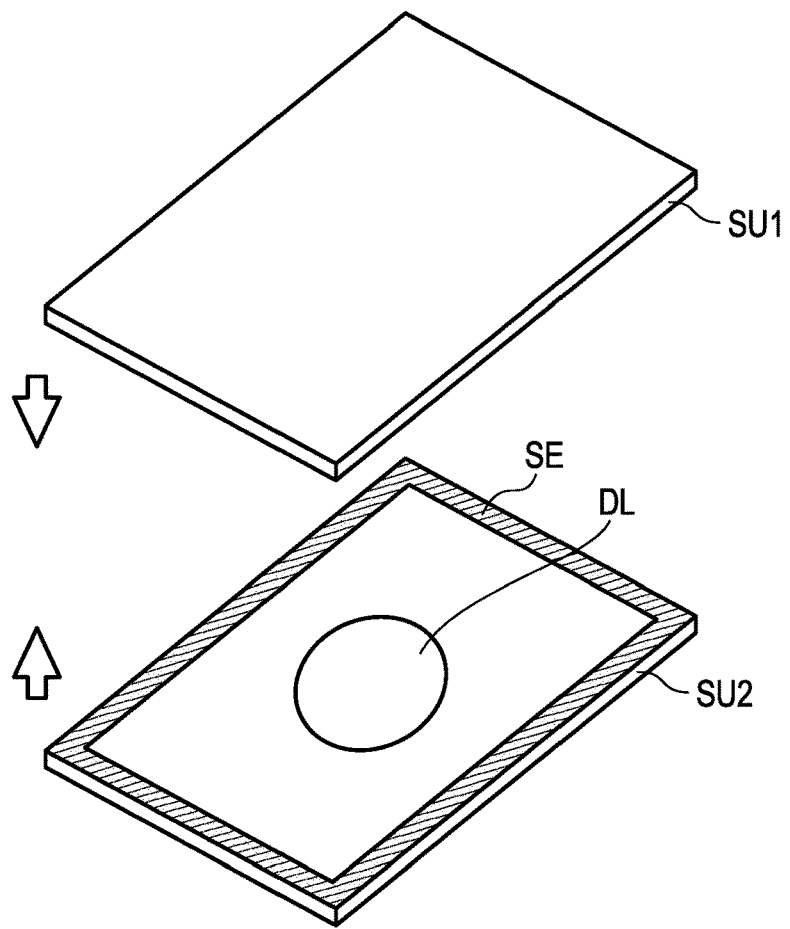
F I G. 12A
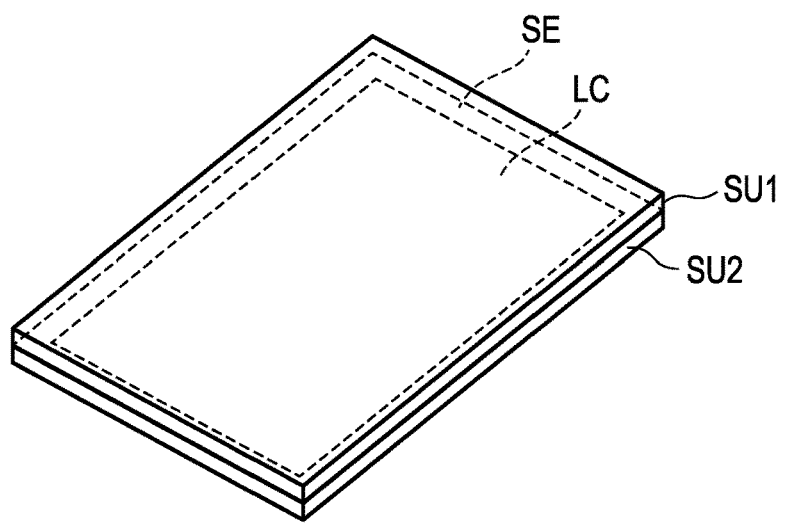
F I G. 12B

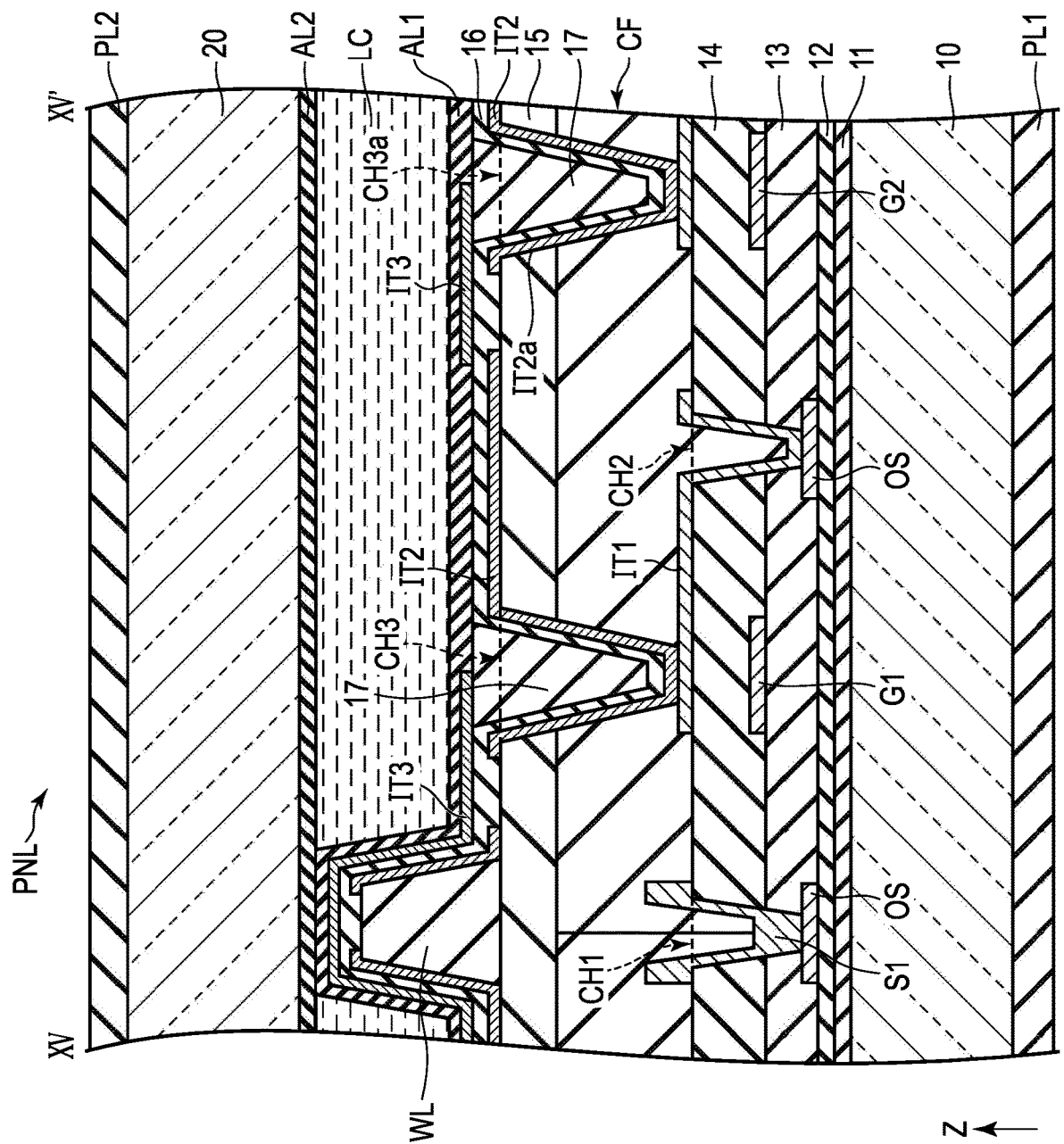
F I G. 15

DISPLAY DEVICE

CROSS-REFERENCE TO RELATED APPLICATIONS

This application is based upon and claims the benefit of priority from Japanese Patent Application No. 2020-019711, filed Feb. 7, 2020, the entire contents of which are incorporated herein by reference.

FIELD

Embodiments described herein relate generally to a display device.

BACKGROUND

In general, a liquid crystal display device comprises a pixel electrode and a common electrode for applying a voltage to a liquid crystal layer, and a switching element connected to the pixel electrode. The pixel electrode and the switching element are connected through a contact hole. Since control of the liquid crystal layer near the contact hole is difficult, a region where the contact hole is a region which does not contribute to display. Therefore, the contact hole is often provided near a boundary of pixels. In addition, since the pixel electrode overlaid on the contact hole needs to be electrically isolated from adjacent pixel electrodes, the pixel electrodes are spaced apart from each other.

Recently, definition of the display device has been made higher. For example, the number of pixels of 2,000 ppi or more is required for a display device used as virtual reality (VR) viewer. In such a liquid crystal display device, the region where the contact hole is formed, a gap of the adjacent pixel electrodes, etc. become so large as to be unignorable in accordance with reduction of the pixel area. In addition, forming sufficient capacitance to secure the alignment of the liquid crystal layer between the pixel electrodes and the common electrode becomes difficult in accordance with reduction of the pixel area.

BRIEF DESCRIPTION OF THE DRAWINGS

FIG. 12A is a view schematically showing an example of a process relating to formation of the liquid crystal layer.

FIG. 12B is a cross-sectional view schematically showing a process following FIG. 12A.

FIG. 15 is a cross-sectional view taken along line XV-XV' shown in FIG. 13.

DETAILED DESCRIPTION

Figure 1:
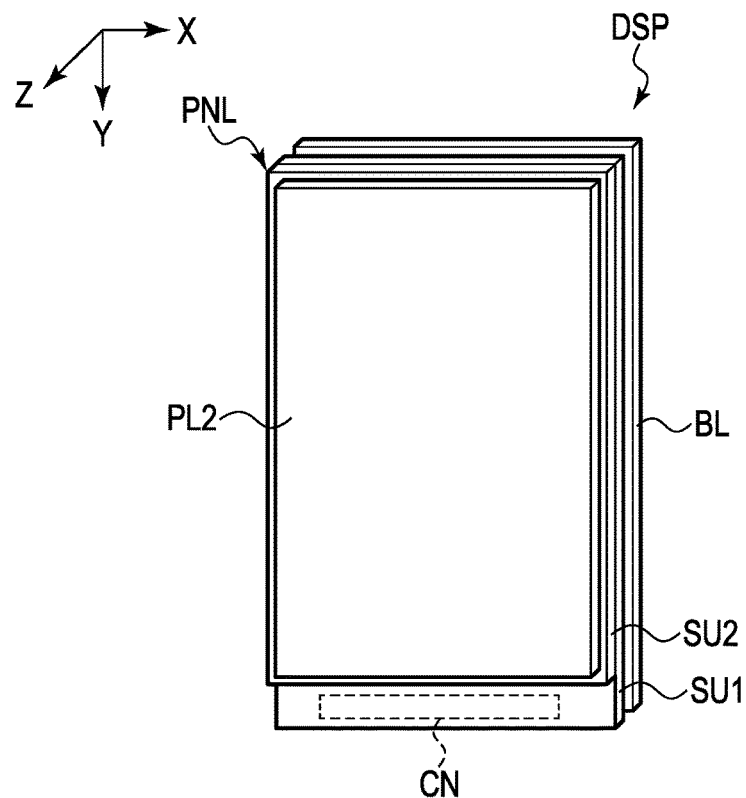
FIG. 1 is a plan view showing an example of an appearance of a display device according to embodiments.

In general, according to one embodiment, a display device comprises a first substrate, a second substrate opposed to the first substrate, and a liquid crystal layer provided between the first substrate and the second substrate. The first substrate includes a first signal line and a second signal line formed of a first metal material and being adjacent to each other in a first direction, a first scanning line and a second scanning line formed of a second metal material and being adjacent to each other in a second direction intersecting the first direction, a semiconductor layer electrically connected to the first signal line and the first scanning line, a first transparent electrode in contact with the semiconductor layer, an organic insulating layer including a contact hole penetrating to the first transparent electrode, and a second transparent electrode in contact with the first transparent electrode through the contact hole. The first transparent electrode is located in a center of a pixel region surrounded by the first signal line, the second signal line, the first scanning line, and the second scanning line in planar view. The contact hole is not overlaid on the first metal material and the second metal material.

According to another embodiment, a display device comprises a semiconductor layer, a first transparent electrode in contact with the semiconductor layer, a second transparent electrode in contact with the first transparent electrode, and a third transparent electrode overlaid on the first transparent electrode and the second transparent electrode. The first transparent electrode includes a first region and four second regions. In the first region, the first transparent electrode is overlaid on the second transparent electrode but is not overlaid on the third transparent electrode. In the second region, the first transparent electrode is overlaid on the second transparent electrode and the third transparent electrode. Four second regions are separated from each other.

According to still another embodiment, a display device comprises a semiconductor layer, a first transparent electrode in contact with the semiconductor layer, a second transparent electrode in contact with the first transparent electrode, and a third transparent electrode overlaid on the first transparent electrode and the second transparent electrode. The third transparent electrode includes an opening. An outer periphery of the first transparent electrode intersects an edge of the opening at eight points.

According to the configuration, a display device capable of improving the display quality can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

In the embodiments, a transmissive liquid crystal display device is disclosed as an example of the display device. This liquid crystal display device can be used for, for example, various devices such as virtual reality (VR) viewers, smartphones, tablet terminals, mobile telephone terminals, notebook-type personal computers, and game consoles.

FIG. 1 is a plan view showing an example of an appearance of a display device DSP according to the embodiments. The first direction X, the second direction Y, and the third direction Z shown in the drawing are orthogonal to each other but may intersect at an angle other than 90 degrees. The first direction X and the second direction Y correspond to the directions parallel to a main surface of a substrate constituting the display device DSP. The third direction Z corresponds to a thickness direction of the display device DSP. In the present specification, an observation position at which the display device DSP is to be observed is assumed to be set at the pointing end side of the arrow indicating the third direction Z, and a view toward an X-Y plane defined by the first direction X and the second direction Y from this observation position is referred to as a planar view.

The display device DSP comprises a display panel PNL, an illumination device (backlight) BL, and a polarizer PL2. The illumination device BL, the display panel PNL, and the polarizer PL2 are overlaid in this order in the third direction Z.

The display panel PNL is an active-matrix liquid crystal display panel. The display panel PNL is formed in, for example, a substantially rectangular shape elongated in the second direction Y. The display panel PNL comprises a first substrate SU1 and a second substrate SU2. The first substrate SU1 includes a connector CN in a region extending further than the second substrate SU2. The connector CN includes terminals for connecting to signal supply sources of a flexible printed circuit, an IC chip, and the like.

The illumination device BL comprises a light guide opposed to the first substrate all, a light source arranged on a side surface of the light guide, various optical sheets arranged between the light guide and the display panel PNL, and the like. The optical sheet is, for example, a prism sheet, a diffusion sheet or the like. The light source has a structure in which, for example, phosphor is overlaid on a blue light emitting diode, and applies white light to the light guide. However, the structure of the light source is not limited to this example.

Figure 2:
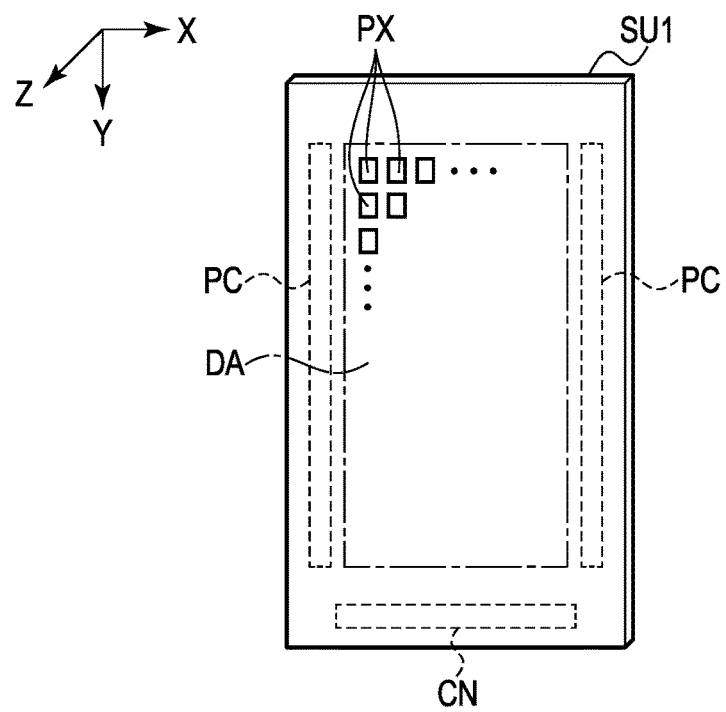
FIG. 2 is a perspective view schematically showing an example of a first substrate shown in FIG. 1.

FIG. 2 is a perspective view schematically showing an example of the first substrate SU1 shown in FIG. 1. The first substrate SU1 comprises a plurality of pixel regions PX in a display unit DA on which an image is displayed. The pixel region PX is indicative of a minimum unit that can be controlled individually relative to the video signal. In the example illustrated, the pixel regions PX are arrayed in a matrix in the first direction X and the second direction Y. In addition, the first substrate SU1 comprises a pair of control circuits PC outside the display unit DA. The control circuits PC control display in the pixel regions PX, based on control signals input from the outside via the connector CN. Incidentally, the control circuits PC may be provided on, for example, a flexible printed circuit connected to the connector CN.

Figure 3:
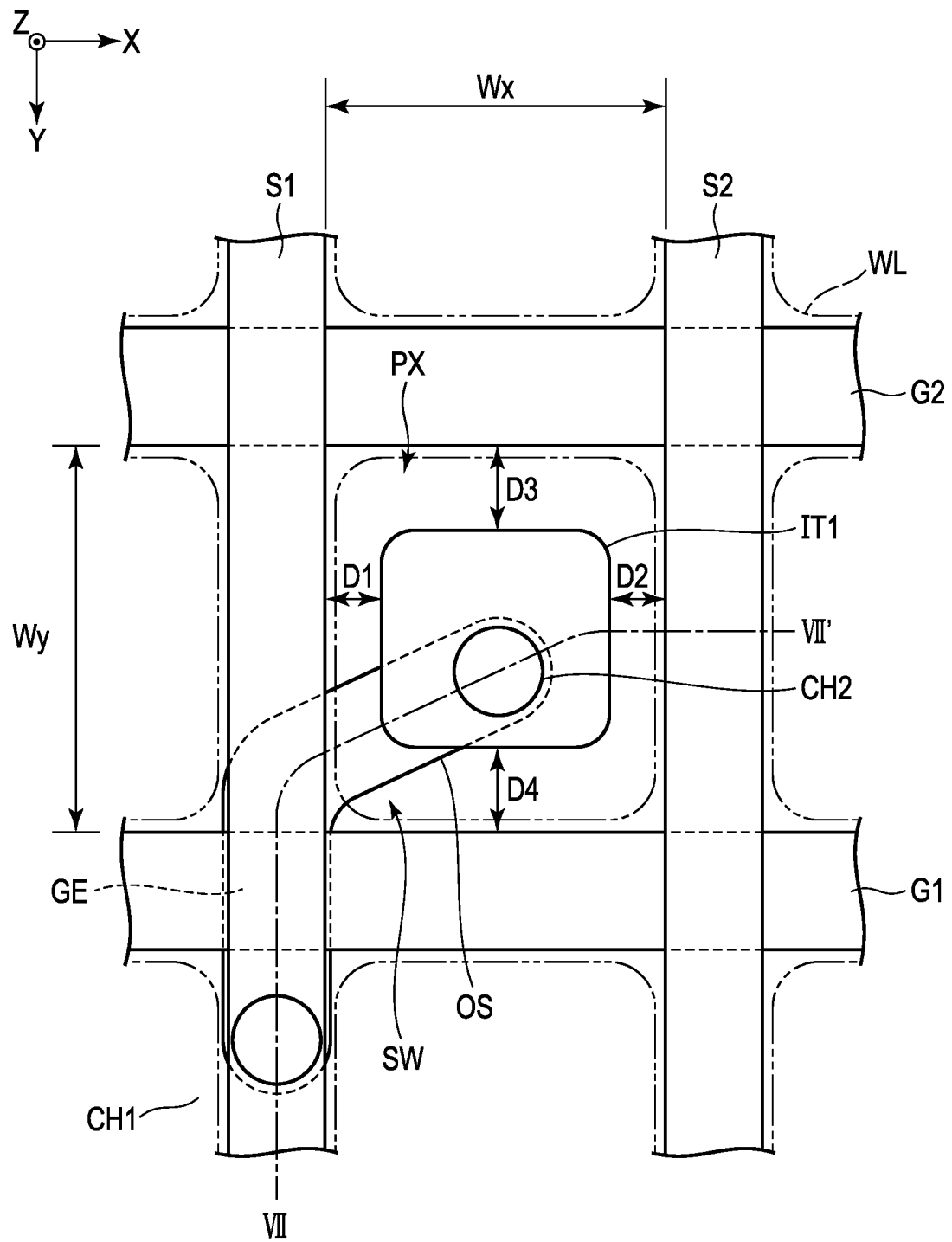
FIG. 3 is a plan view schematically showing an example of a pixel region shown in FIG. 2.

FIG. 3 is a plan view schematically showing an example of the pixel region PX shown in FIG. 2. The first substrate SU1 comprises a plurality of signal lines S (S1 and S2), a plurality of scanning lines G (G1 and G2), a semiconductor layer OS, and a first transparent electrode IT1. For example, the signal line S1 extends in the second direction Y and is arranged in the first direction X. For example, the scanning lines G extend in the first direction X and are arranged in the second direction Y. In the present specification, the pixel region PX corresponds to a region which contributes to display, i.e., a region which enables the light emitted from the illumination device BL to be transmitted or a region surrounded by adjacent signal lines S and adjacent scanning lines G.

The pixel region PX has a width Wx in the first direction X and a width Wy in the second direction Y. For example, the width Wx is smaller than the width Wy. A ratio of the width Wx to the width Wy, i.e., Wx:Wy is, for example, 3:4. When high resolution is required, the density of the pixel region PX provided in the display panel PNL is desirably, for example, 1,000 ppi or more and, more desirably, 2,000 ppi or more. When the density of the pixel region PX is, for example, 2,000 ppi, the width Wx is, for example, 6.3 μm.

The semiconductor layer OS constitutes a thin-film transistor serving as a switching element SW. The semiconductor layer OS is formed of, for example, a transparent oxide semiconductor. One end side of the semiconductor layer OS is connected to the signal line S1 through a contact hole CH1. The other end side of the semiconductor layer OS is connected to the first transparent electrode IT1 through a contact hole CH2. In the example illustrated, the semiconductor layer OS is bent obliquely in the first direction X and the second direction Y and intersects the scanning line G1. A part of the scanning line G1 that is overlaid on the semiconductor layer OS functions as a gate electrode GE of the switching element SW.

The pixel region PX of high definition such as 2,000 ppi is too small to form the semiconductor layer OS in an L letter shape from the contact hole CH1 to the contact hole CH2. For this reason, the semiconductor layers adjacent in the second direction Y may be short (or in contact with each other).

In contrast, the semiconductor layer OS of the embodiments is bent to extend obliquely to the second direction Y toward the contact hole CH2. Therefore, an inconvenience of being close to the semiconductor layer OS of the pixel regions PX adjacent in the second direction Y can be avoided.

The first transparent electrode IT1 is located in the pixel region PX. In other words, the first transparent electrode IT1 is not overlaid on any one of the signal line S1, the signal line S2, the scanning line G1, and the scanning line G2. In the example illustrated, The first transparent electrode IT1 has a substantially rectangular shape elongated in the first direction X with four corner portions formed in a curved shape.

In the embodiments, the first transparent electrode IT1 is located substantially in the center of the pixel region PX. The center indicates that distances D1 and D2 between the first transparent electrode IT1 and the signal lines S1 and S2 are equal to each other and that distances D3 and D4 between the first transparent electrode IT1 and the scanning lines G1 and G2 are equal to each other. The distances D1 and D2 are the distances in the first direction X. The distances D3 and D4 are the distances in the second direction Y. Incidentally, the distances D1 and D2, and the distances D3 and D4 may be equal within a range of accuracy in the manufacturing process. The wording "equal" is indicative of not complete coincidence after manufacturing, but a range of permitting a difference in accuracy in the manufacturing process. The range of accuracy is assumed to be, for example, ±0.5 μm.

In addition, the first substrate SU1 has a box frame WL overlaid on the signal lines S and the scanning lines G. That is, the box frame WL is provided in a grating shape in planar view. For example, such a box frame WL may function as a space for holding an interval between the first substrate SU1 and the second substrate SU2. The box frame WL extending along the signal lines S has a width slightly greater than the width of the signal lines S and is overlaid on all the signal lines S in the example illustrated. The box frame WL extending along the scanning lines G has a width slightly greater than the width of the scanning lines G and is overlaid on all the scanning lines G in the example illustrated.

Figure 4:
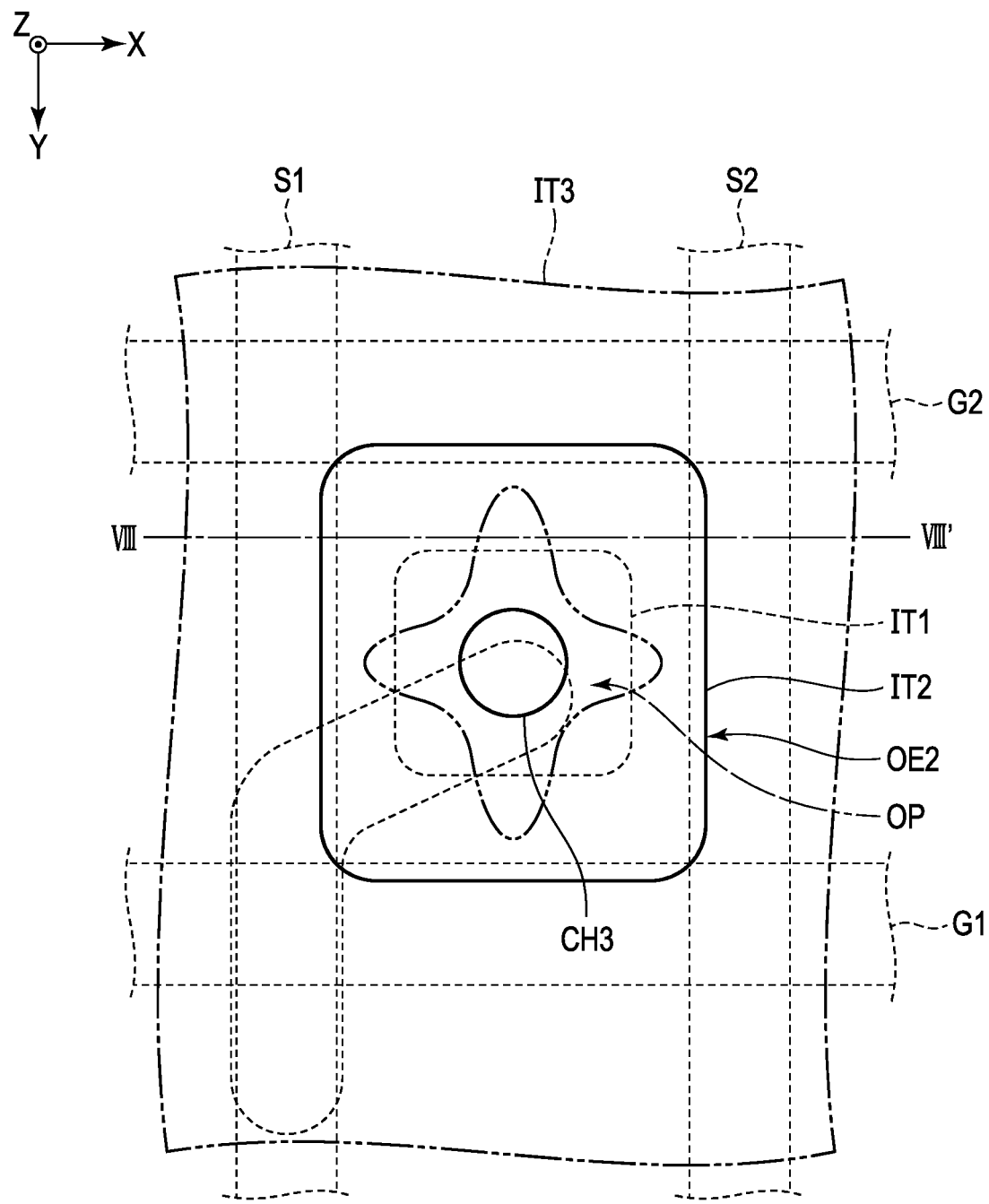
FIG. 4 is a plan view showing a configuration example of the first substrate in the pixel region.

FIG. 4 is a plan view showing a configuration example of the first substrate SU1 in the pixel region PX. The first substrate SU1 comprises a second transparent electrode IT2 and a third transparent electrode IT3 in addition to the signal lines S1 and S2, the scanning lines G1 and G2, the semiconductor layer OS, and the first transparent electrode IT1.

The second transparent electrode IT2 has an area slightly larger than the pixel region PX and is overlaid on the entire pixel region PX. That is, an outer periphery OE2 of the second transparent electrode IT2 is overlaid on the signal line S1, the signal line S2, the scanning line G1, and the scanning line G2. The second transparent electrode IT2 is connected to the first transparent electrode IT1 through a contact hole CH3. The contact hole CH3 is located substantially in the center of the pixel region PX. In other words, the contact hole CH3 is located in the center of the second transparent electrode IT2. In this example, the wording "substantially in the center" of the sentence "the contact hole CH3 is located in the center of the second transparent electrode IT2" permits a difference in the manufacturing process as described above.

The third transparent electrode IT3 is formed over the entire body of the first substrate SU1. The third transparent electrode IT3 includes an opening OP overlaid on the contact hole CH3. The opening OP is located in the pixel region PX and is not overlaid on any one of the signal line S1, the signal line S2, the scanning line G1, and the scanning line G2. In the embodiments, the opening OP has a symmetrical shape with respect to the first direction X and the second direction Y and is substantially shaped in a cross in the example illustrated.

Figure 5:
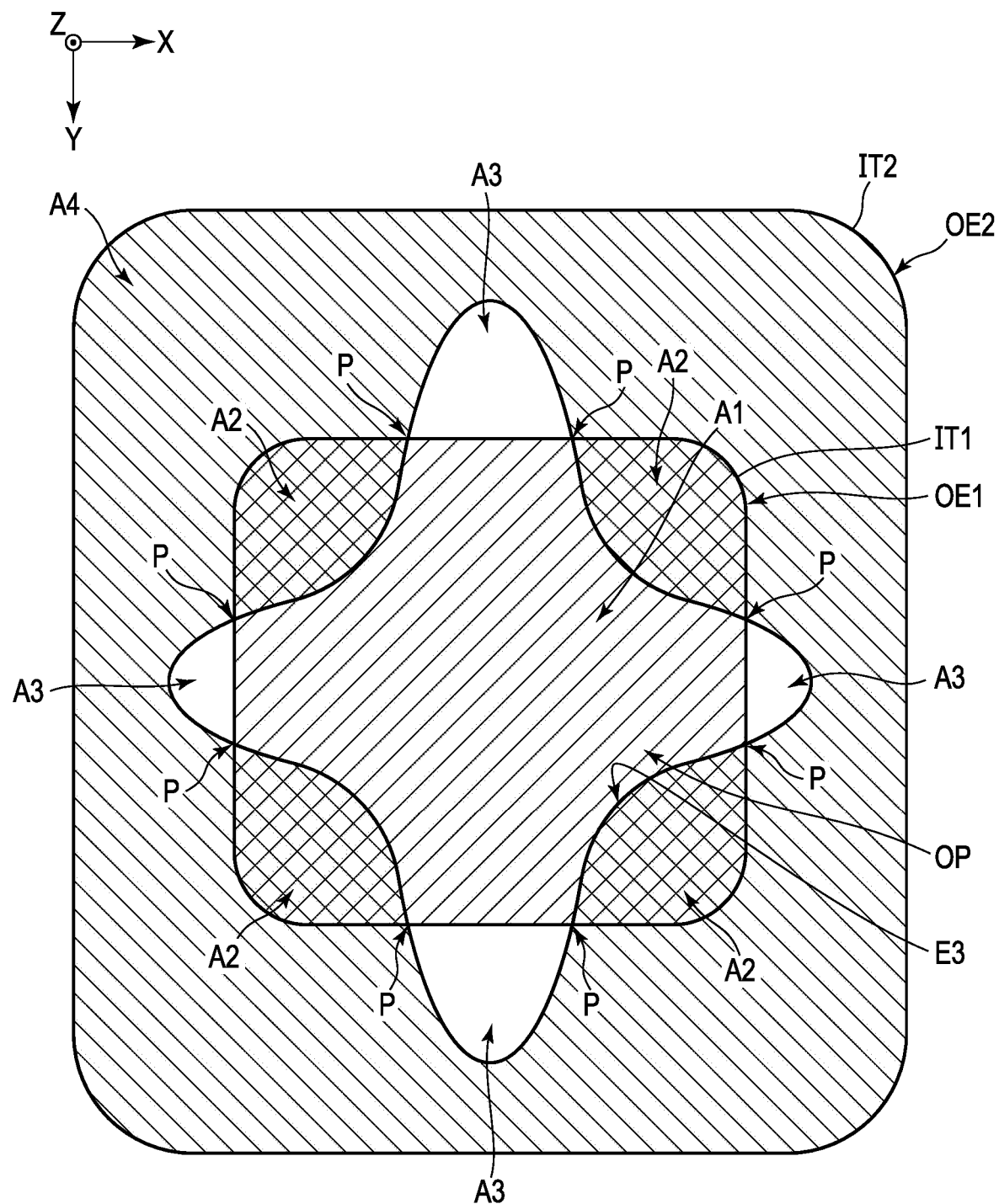
FIG. 5 is an enlarged plan view showing a first transparent electrode, a second transparent electrode, and an opening shown in FIG. 4.

FIG. 5 is an enlarged plan view showing the first transparent electrode IT1, the second transparent electrode IT2, and the opening OP of the third transparent electrode IT3 shown in FIG. 4. In the drawing, the region where the first transparent electrode IT1 and the second transparent electrode IT2 are overlaid is illustrated by right-upward diagonal hatch lines, the region where the second transparent electrode IT2 and the third transparent electrode IT3 are overlaid is illustrated by right-downward diagonal hatch lines, and the region where the first transparent electrode IT1, the second transparent electrode IT2, and the third transparent electrode IT3 are overlaid is illustrated by both right-upward diagonal hatch lines and right-downward diagonal hatch lines.

Each of the first transparent electrode IT1 and the opening OP is located in a region where the second transparent electrode IT2 is provided. That is, the first transparent electrode IT1 and the opening OP are surrounded by the outer periphery OE2 of the second transparent electrode IT2 in planar view.

The first transparent electrode IT1 and the opening OP are partially overlaid. The first transparent electrode IT1 includes a first region A1 overlaid on the opening OP and four second regions A2 that are not overlaid on the opening OP. In other words, in the first region A1, the first transparent electrode IT1 is overlaid on the second transparent electrode IT2 but is not overlaid on the third transparent electrode IT3. In the second regions A2, the first transparent electrode IT1 is overlaid on both the second transparent electrode IT2 and the third transparent electrode IT3. In the drawing, the first region A1 corresponds to the region where the right-upward diagonal hatch lines are drawn, and includes the contact hole CH3. The second regions A2 correspond to the regions where the right-upward diagonal hatch lines and right-downward diagonal hatch lines are drawn, and are separated from each other.

The above structure can be described in the following manner with respect to the relationship between an outer periphery OE1 of the first transparent electrode IT1 and an edge of the third transparent electrode IT3 defining the opening OP (hereinafter referred to as an edge of the opening OP). That is, the outer periphery OE1 of the first transparent electrode IT1 and an edge E3 of the opening OP intersect at eight points P.

The second transparent electrode IT2 includes four third regions A3 overlaid on the opening OP and one fourth region A4 that is not overlaid on the opening OP, in regions on the outer side than the first transparent electrode IT1. In other words, in the third regions A3, the second transparent electrode IT2 is not overlaid on any one of the first transparent electrode IT1 and the third transparent electrode IT3. In the fourth region A4, the second transparent electrode IT2 is overlaid on the third transparent electrode IT3 but is not overlaid on the first transparent electrode IT1. In the drawing, the third regions A3 correspond to regions where no hatch lines are drawn, and are separated from each other and each of them is adjacent to the first region A1. The fourth region A4 corresponds to the region where the right-downward diagonal hatch lines are drawn, and surrounds the first region A1, the second regions A2, and the third regions A3.

Figure 6:
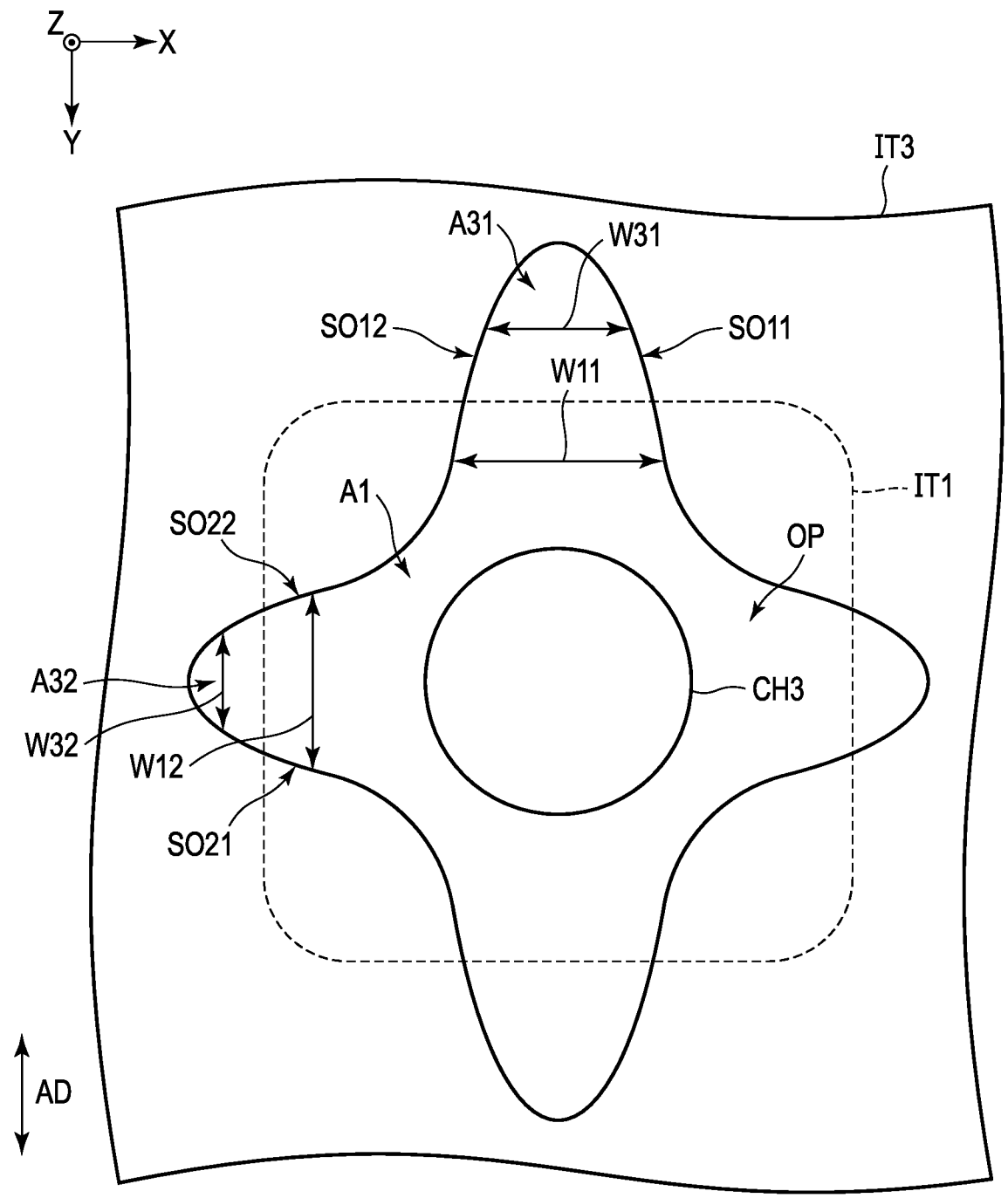
FIG. 6 is an enlarged plan view showing the opening.

FIG. 6 is an enlarged plan view showing the opening OP. In the embodiments, the width on the side of the opening OP which is close to the contact hole CH3 is greater than the width of the side of the opening OP which is separated from the contact hole CH3.

For example, a third region A31 adjacent to the first region A1 in the second direction Y has a width W31 in the first direction X. The first region A1 between the third region A31 and the contact hole CH3 has a width W11 in the first direction X. The width W11 is greater than the width W31. In other words, two sides SO11 and SO12 of the third transparent electrode IT3 that face each other extend in directions intersecting each other, and extend to be inclined to an alignment treatment direction AD. The sides SO11 and SO12 are the sides extending from the third region A31 across the first region A1 and are parts of an edge E3 of the opening OP.

In addition, a third region A32 adjacent to the first region A1 in the first direction X has a width W32 in the second direction Y. The first region A1 between the third region A32 and the contact hole CH3 has a width W12 in the second direction Y. The width W12 is greater than the width W32. In other words, two sides SO21 and SO22 of the third transparent electrode IT3 that face each other extend in directions intersecting each other, and extend to be inclined to the alignment treatment direction AD. The sides SO21 and SO22 are the sides extending from the third region A32 across the first region A1 and are parts of an edge E3 of the opening OP.

Figure 7:
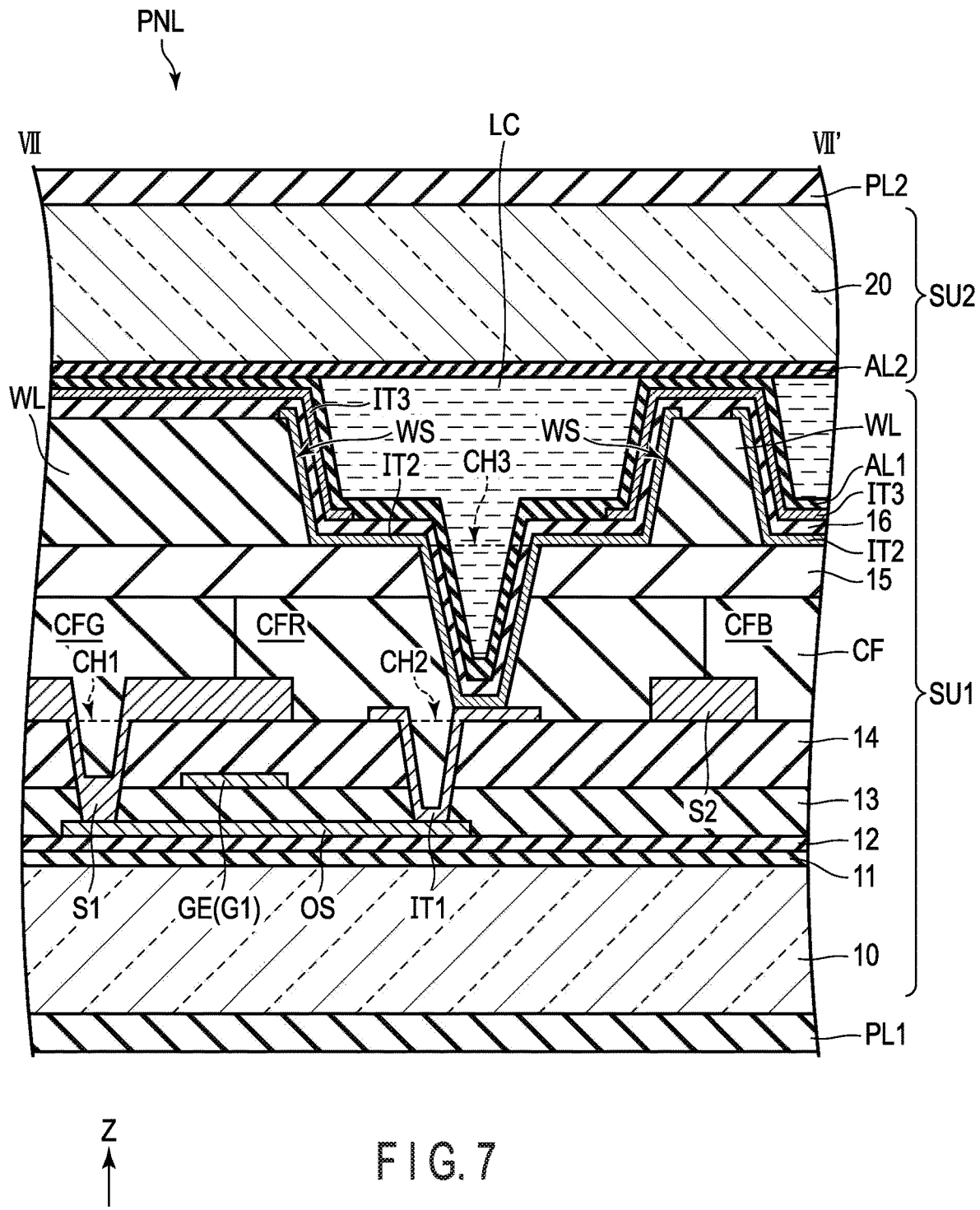
FIG. 7 is a cross-sectional view taken along line VII-VII' shown in FIG. 3.

FIG. 7 is a cross-sectional view taken along line VII-VII' shown in FIG. 3. Incidentally, in the present specification, a direction from the first substrate SU1 to the second substrate SU2 may be referred to as an upper side (or, more simply, upwardly) and a direction from the second substrate SU2 to the first substrate SU1 may be referred to as a lower side direction (or, more simply, downwardly). According to "a second member above a first member" and "a second member below a first member", the second member may be in contact with the first member or may be remote from the first member.

The crystal panel PNL comprises a liquid crystal layer LC and a polarizer PL1 in addition to the first substrate SU1, the second substrate SU2, and the polarizer PL2.

The first substrate SU1 comprises an insulating substrate 10, insulating layers 11, 12, 13, 14, 15, and 16, a color filter layer CF, an alignment film AL1, and the like in addition to the semiconductor layer OS, the signal line S1, the scanning line G1, the first transparent electrode IT1, the second transparent electrode IT2, the third transparent electrode IT3, and the box frame WL.

The insulating substrate 10 is a transparent substrate formed of an insulating material such as glass or resin. The insulating layer 11 covers a surface of the insulating substrate 10 that is opposed to the second substrate SU2. The insulating layer 12 covers the insulating layer 11. The semiconductor layer OS is formed on the insulating layer 12 and is covered with the insulating layer 13. The scanning line G1 is formed on the insulating layer 13 and is covered with the insulating layer 14. The insulating layers 11, 12, 13, and 14 are formed of an inorganic insulating material such as silicon oxide, silicon nitride, or silicon oxynitride. The scanning line G1 is formed of a second metal material. The second metal material may be formed of a metal material such as aluminum, titanium, silver, molybdenum, tungsten, copper or chromium or an alloy formed by a combination of these metal materials, and may be formed to have a single-layer structure or a multi-layer structure.

The signal line S1 and the first transparent electrode IT1 are formed on the insulating layer 14. The signal line S1 is in contact with the semiconductor layer OS through the contact hole CH1 which penetrates the insulating layers 14 and 13 to the semiconductor layer OS. The first transparent electrode IT1 is in contact with the semiconductor layer OS through the contact hole CH2 which penetrates the insulating layers 14 and 13 to the semiconductor layer OS. The material of which the signal line S1 is formed is a first metal material. The above metal materials can be used as the first metal material. The first metal material may be the same as or different from a second metal material. The first transparent electrode IT1 is formed of, for example, a transparent conductive material such as indium tin oxide (ITO) or indium zinc oxide (IZO). The signal line S1 and the first transparent electrode IT1 are covered with the color filter layer CF.

The color filter layer CF is formed of colored resin. The color filter layer CF includes, for example, a red color filter CFR, a green color filter CFG, and a blue color filter CFB. The color filter layer CF is covered with an insulating layer (planarizing layer) 15 formed of a transparent organic insulating material. Incidentally, the color filter layer CF and the insulating layer 15 are often referred to as organic insulating layers.

The box frame WL is formed on the insulating layer 15. The box frame WL is formed of, for example, an organic insulating material such as polyimide. The box frame WL includes inclined side surfaces WS. The second transparent electrode IT2 covers the side surfaces WS and is also formed on the insulating layer 15. In addition, the second transparent electrode IT2 is in contact with the first transparent electrode IT1 through the contact hole CH3 that penetrates the organic insulating layers (i.e., the insulating layer 15 and the color filter layer CF) to the first transparent electrode IT1. The insulating layer 16 covers the box frame WL and the second transparent electrode IT2. The third transparent electrode IT3 is formed on the substantially entire body of the insulating layer 16 except for the periphery of the contact hole CH3. The third transparent electrode IT3 is covered with the alignment film AL1.

The insulating layer 16 is formed of, for example, an inorganic insulating material such as silicon nitride or silicon oxynitride. Incidentally, the insulating layer 16 is often referred to as an inorganic insulating layer. The second transparent electrode IT2 and the third transparent electrode IT3 are formed of, for example, a transparent conductive material such as ITO or IZO, similarly to the first transparent electrode IT1. The second transparent electrode IT2 and the third transparent electrode IT3 are opposed through the insulating layer 16, on the side surfaces WS of the box frame WL. That is, the second transparent electrode IT2, the insulating layer 16, and the third transparent electrode IT3 are overlaid in this order on the side surfaces WS. A capacitance for holding the aligned state of the liquid crystal layer LC is formed between the second transparent electrode IT2 and the third transparent electrode IT3.

In addition, since the first transparent electrode IT1 and the second transparent electrode IT2 are formed of a transparent conductive material, regions where the contact hole CH2 and the contact hole CH3 are formed are the regions that are not shielded from the light by the metal materials such as the signal lines S and the scanning lines G. The regions where the contact holes are formed correspond to the regions where two conductive materials or the conductive material and the semiconductor layer are in contact with each other through the contact holes. That is, the region where the semiconductor layer OS and the first transparent electrode IT1 are in contact with each other through the contact hole CH2 is not overlaid on the first metal material and the second metal material that form the signal lines S and the scanning lines G. In addition, the region where the first transparent electrode IT1 and the second transparent electrode IT2 are in contact with each other through the contact hole CH3 is not overlaid on the first metal material and the second metal material that form the signal lines S and the scanning lines G.

The second substrate SU2 comprises an insulating substrate 20, an alignment film AL2, and the like. The insulating substrate 20 is a transparent substrate formed of an insulating material such as glass or resin. The alignment film AL2 covers a surface of the insulating substrate 20 that is opposed to the first substrate SU1. In addition, in the present example, a black matrix layer (light-shielding layer) provided in the insulating substrate 20 as used in a number of liquid crystal display devices is not provided. That is, the contact hole CH2 and the contact hole CH3 are not shielded from the light by a light shielding member such as a black matrix.

The liquid crystal layer LC is located between the first substrate SU1 and the second substrate SU2 and is held between the alignment film AL1 and the alignment film AL2. The alignment treatment direction AD of the alignment films AL1 and AL2 is parallel to, for example, the second direction Y.

The polarizer PL1 is provided on an outer surface of the insulating substrate 10, i.e., a surface on the side opposite to the surface opposed to the second substrate SU2. The polarizer PL2 is provided on an outer surface of the insulating substrate 20, i.e., a surface on the side opposite to the surface opposed to the first substrate SU1. One of an absorption axis of the polarizer PL1 and an absorption axis of the polarizer PL2 is parallel to the alignment treatment direction AD while the other is perpendicular to the alignment treatment direction AD. In such a configuration, the display device DSP is in a dark display state in which the light transmittance is small when no voltage is applied between the second transparent electrode IT2 and the third transparent electrode IT3, and is in a display state in which the light transmittance is large when the voltage is applied between the second transparent electrode IT2 and the third transparent electrode IT3.

In the embodiments, the first substrate SU1 and the second substrate SU2 are in contact with each other in the region where the box frame WL is provided. That is, the alignment film AL1 and the alignment film AL2 are in contact with each other in the region where the box frame WL is provided. The height of the box frame WL provided along the signal lines S may be different from the height of the box frame WL provided along the scanning lines G, although not shown in the drawing. In this case, the first substrate SU1 is in contact with the second substrate SU2 in a region overlaid on any of the signal lines S and the scanning lines G, and the liquid crystal layer LC is interposed between the first substrate SU1 and the second substrate SU2 in a region where the others are provided.

Figure 8:
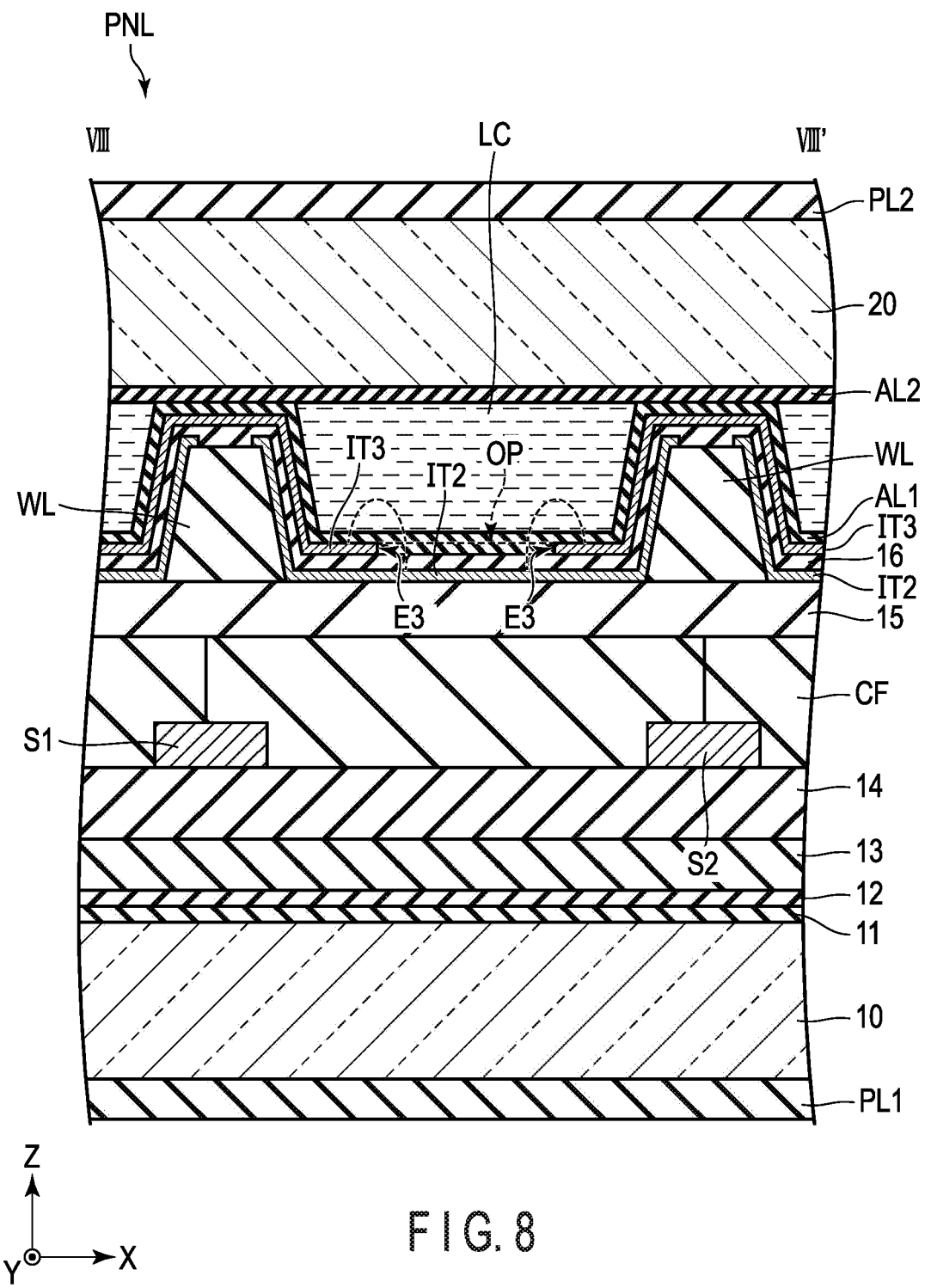
FIG. 8 is a cross-sectional view taken along line VIII-VIII' shown in FIG. 4.

FIG. 8 is a cross-sectional view taken along line VIII-VIII' shown in FIG. 4. When a voltage is applied between the second transparent electrode IT2 and the third transparent electrode IT3, a fringing field is formed near the edge E3 of the opening OP formed in the third transparent electrode IT3. In the drawing, an example of the fringing field is represented by a broken line. Liquid crystal molecules contained in the liquid crystal layer LC are, for example, liquid crystal molecules having a positive dielectric anisotropy in which the dielectric constant in the longer axis (molecular axis) direction is larger than a dielectric constant in the shorter axis direction. In the application of the voltage, a force acts to rotate the liquid crystal molecules such that the longer axis of the liquid crystal molecules is parallel to the direction of the fringing field. Incidentally, the liquid crystal molecules may have a negative dielectric anisotropy. In this case, a response speed of the liquid crystal molecules is low, but a higher light transmittance is implemented.

Figure 9:
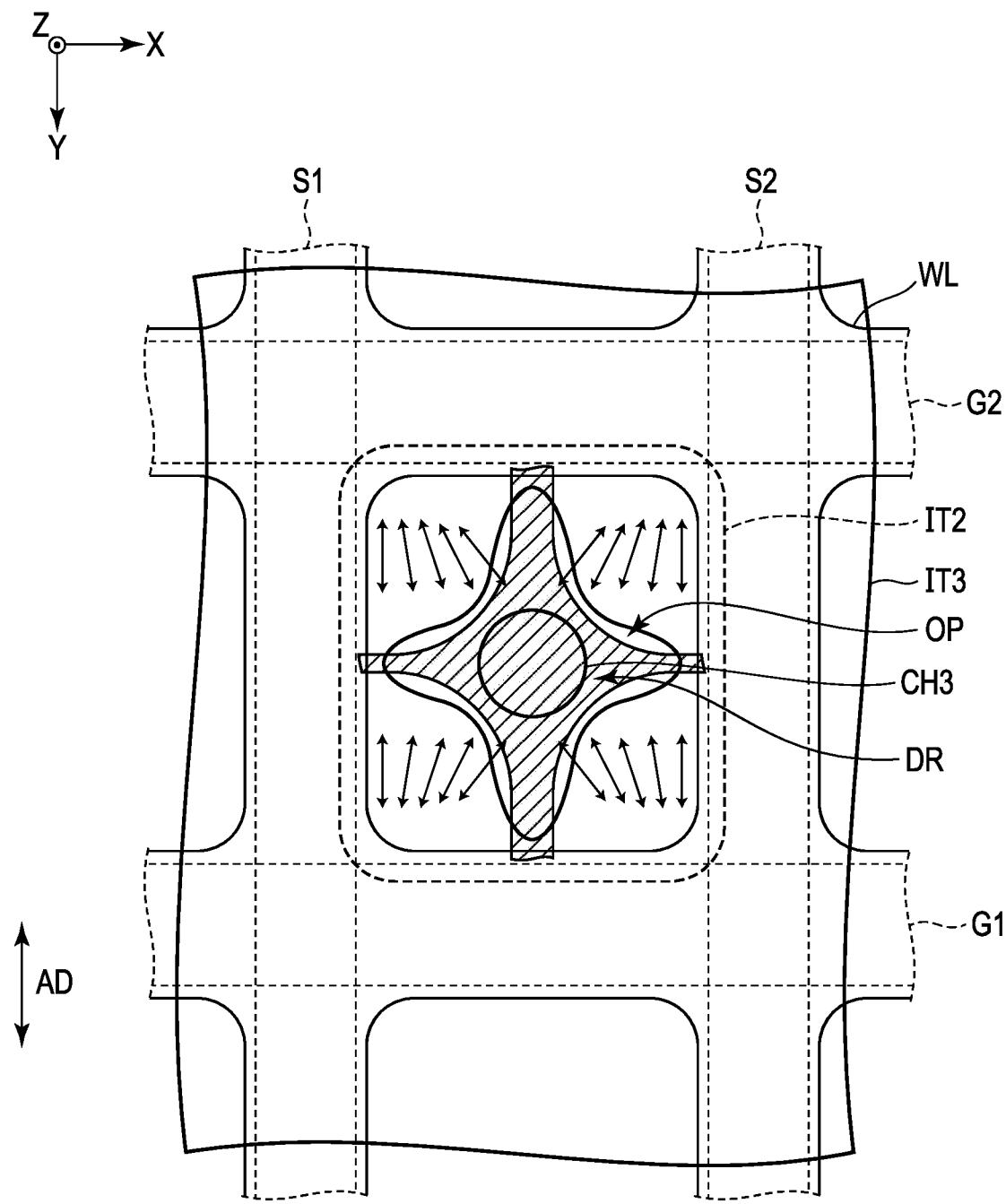
FIG. 9 is a plan view showing an example of a liquid crystal domain formed by a fringing field shown in FIG. 8.

FIG. 9 is a plan view showing an example of a liquid crystal domain formed by a fringing field shown in FIG. 8. In the drawing, the longer axis direction of the liquid crystal molecules is represented by an arrow. As described above, the alignment treatment direction AD of the alignment films AL1 and AL2 is parallel to the second direction Y. The longer axis direction of the liquid crystal molecules is maintained in the alignment treatment direction AD by the anchoring force of the alignment film AL1, in the vicinity of the box frame (for example, box frame overlaid on the signal lines S) WL. In contrast, the alignment variation of the liquid crystal molecules, particularly, splay deformation occurs between the box frame WL and the fringing field. More specifically, splay deformation of the liquid crystal molecules occurs in the plane parallel to the first direction X and the second direction Y. The elastic deformation corresponding to the splay deformation is larger than the elastic deformation corresponding to the twisting deformation or bending deformation. Therefore, a more desirable response characteristic of the display panel PNL can be obtained by causing the alignment variation, particularly, splay deformation to occur. Incidentally, the twisting alignment of the liquid crystal molecules occurs in the third direction Z.

In the example illustrated, four liquid crystal domains are formed. Twisting alignment in mutually opposite direction occurs in adjacent liquid crystal domains. In the drawing, for example, the same twisting alignment occurs in upper right and lower left regions of the pixel region PX, the twisting alignment occurs in a direction opposite to that of the upper right and lower left regions of the pixel region PX, in upper left and lower right regions of the pixel region PX. In addition, a dark line region DR is formed by allowing the liquid crystal variation to be antagonistic in the opposite directions, at a central part of the pixel region PX, as illustrated by the hatch lines in the drawing. In the example illustrated, the dark line region DR is distributed symmetrically with respect to the first direction X and the second direction Y and is entirely overlaid on the contact hole CH3. In the dark line region DR, the alignment direction of the liquid crystal molecules is hardly changed from the alignment treatment direction AD. For this reason, the light emitted from the illumination device BL is hardly transmitted through the dark line region DR.

Figure 10:
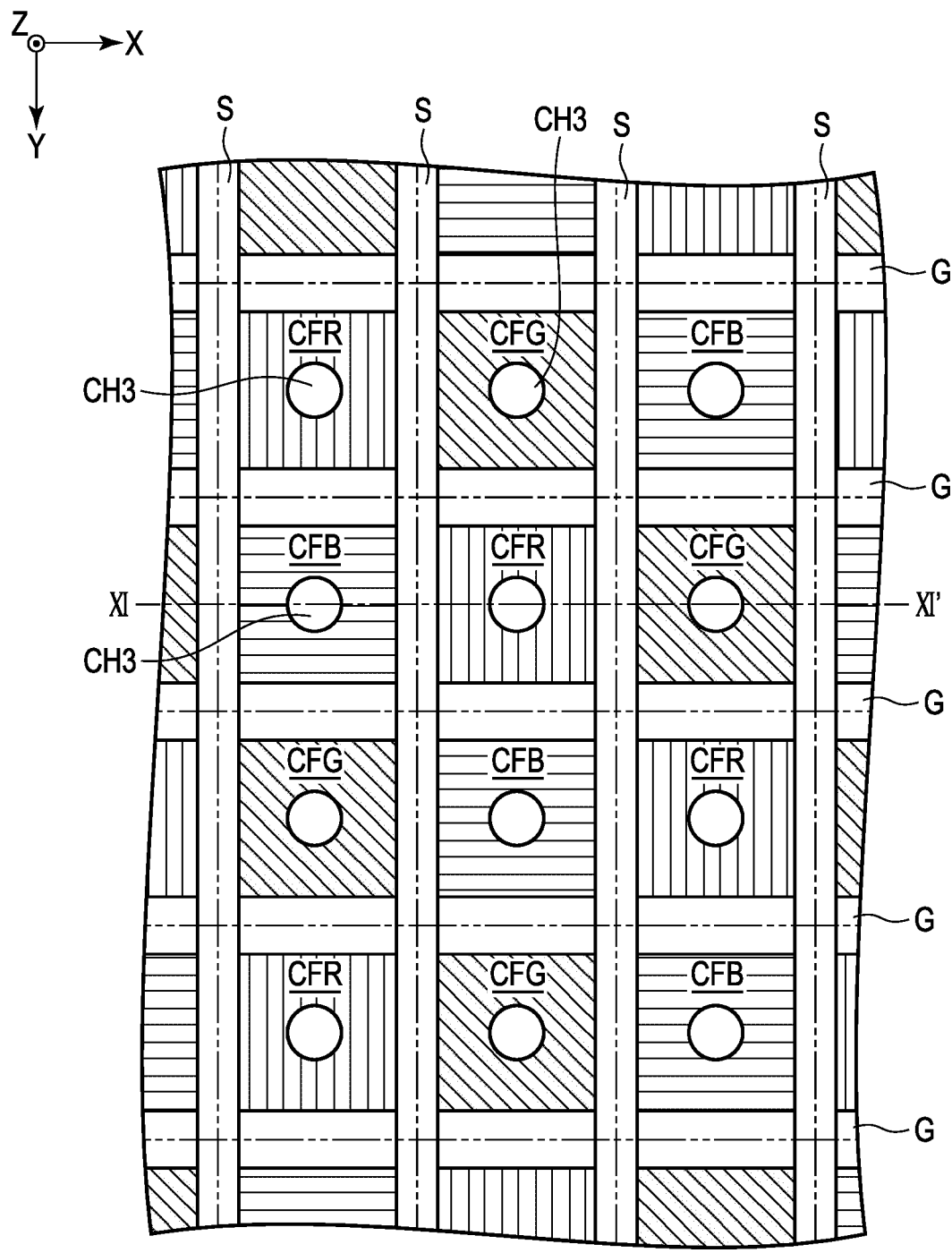
FIG. 10 is a plan view schematically showing an arrangement example of a color filter.

FIG. 10 is a plan view schematically showing an arrangement example of color filters CFR, CFG, and CFB. The color filters CFR, CFG, and CFB are arranged in diagonal directions intersecting the first direction X and the second direction Y. In other words, the color filters CFR, CFG, and CFB are arranged in this order in first direction X, and the color filters CFR, CFB, and CFG are arranged in this order in the second direction Y. In such an arrangement, non-uniformity in display hardly occurs since the color filters of different colors are dispersed in the first direction X and the second direction Y. Boundaries of the color filters of different colors are overlaid on the scanning lines G and the signal lines S.

Next, a method of manufacturing the display device DSP will be described with reference to FIGS. 11A to 12B. FIGS. 11A to 11D schematically show a process relating to the formation of the contact hole CH3, of the process of manufacturing the display device DSP. FIGS. 11A to 11D correspond to cross-sectional views showing a part of the first substrate SU1 as taken along line XI-XI' shown in FIG. 10.

Figure 11A:
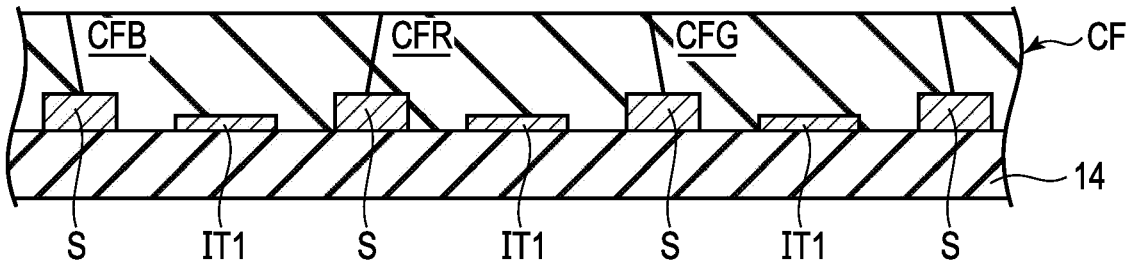
FIG. 11A is a cross-sectional view schematically showing an example of a process relating to formation of a contact hole.

First, as shown in FIG. 11A, the color filter layer CF is formed on the insulating layer 14, the signal lines S, and the first transparent electrode IT1. For example, each of the color filters CFR, CFG, and CFB is formed of siloxane-based resin mixed with pigment, and is subjected to patterning by wet etching. The color filters CFG, CFR, and CFB are formed, for example, in this order. However, the embodiment is not limited to this example.

Figure 11B:
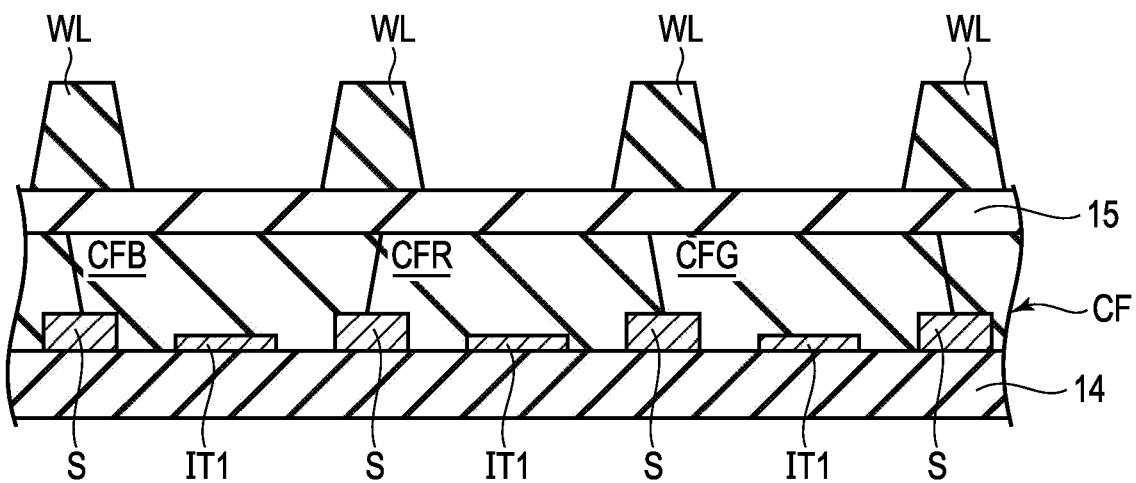
FIG. 11B is a cross-sectional view schematically showing a process following FIG. 11A.

Next, as shown in FIG. 11B, the transparent insulating layer 15 of siloxane-based resin is formed. Next, the box frame WL is formed on the insulating layer 15. The box frame WL is formed of, for example, an organic insulating material such as polyimide having a photosensitive property and is subjected to patterning by photolithography.

Figure 11C:
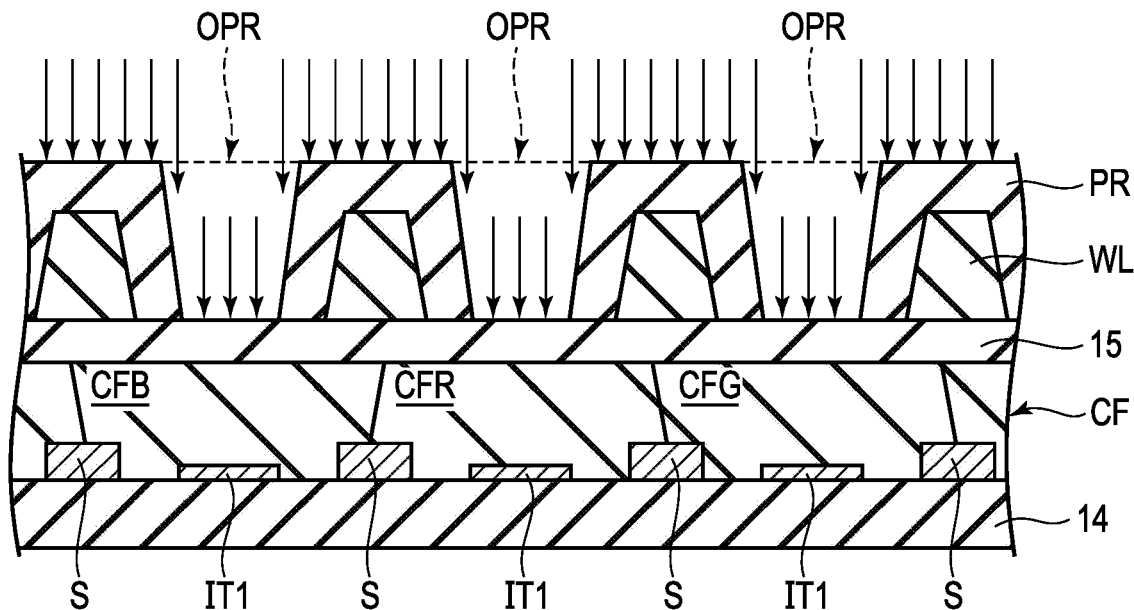
FIG. 11C is a cross-sectional view schematically showing a process following FIG. 11B.

Next, as shown in FIG. 11C, the photoresist PR is applied onto the box frame WL and the insulating layer 15, and openings OPR are formed at positions overlaid on the first transparent electrode IT1 by the photolithography. Next, dry etching is executed with the photoresist PR used as a mask. The etching gas is, for example, a fluorine-based gas formed by mixing $CF_4$ and $O_2$ and is plasmarized. As represented by arrows in the drawing, the etching gas is accelerated by the electric field and applied onto the photoresist PR.

Figure 11D:
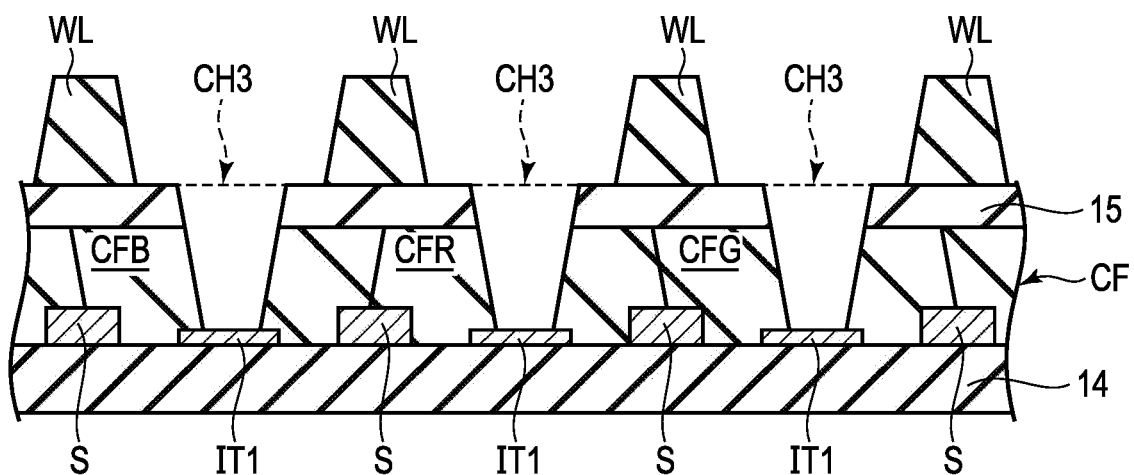
FIG. 11D is a cross-sectional view schematically showing a process following FIG. 11C.

As shown in FIG. 11D, the contact holes CH3 that penetrate the insulating layer 15 and the color filter layer CF to the first transparent electrode IT1 are thereby formed. After that, the photoresist PR is removed and the first substrate SU1 comprising the contact holes CH3 is obtained. Incidentally, the pigment contained in the color filters CFR, CFG, and CFB is often the residue in dry etching. The residue may be remove by oxygen asking or an organic solvent.

FIGS. 12A and 12B are views showing a process relating to the formation of the liquid crystal layer LC, of the process of manufacturing the display device DSP. First, as shown in FIG. 12A, a frame-shaped sealing member SE is applied onto an inner surface of the second substrate SU2 covered with the alignment film AL2. Next, liquid crystal DL is dropped into the region surrounded by the sealing member SE. After that, as shown in FIG. 12B, the second substrate SU2 is stuck on the first substrate SU1, and the liquid crystal layer LC is thereby formed on the entire body between the first substrate SU1 and the second substrate SU2.

Next, a comparative example of the embodiments will be described with reference to FIGS. 13 to 15.

Figure 13:
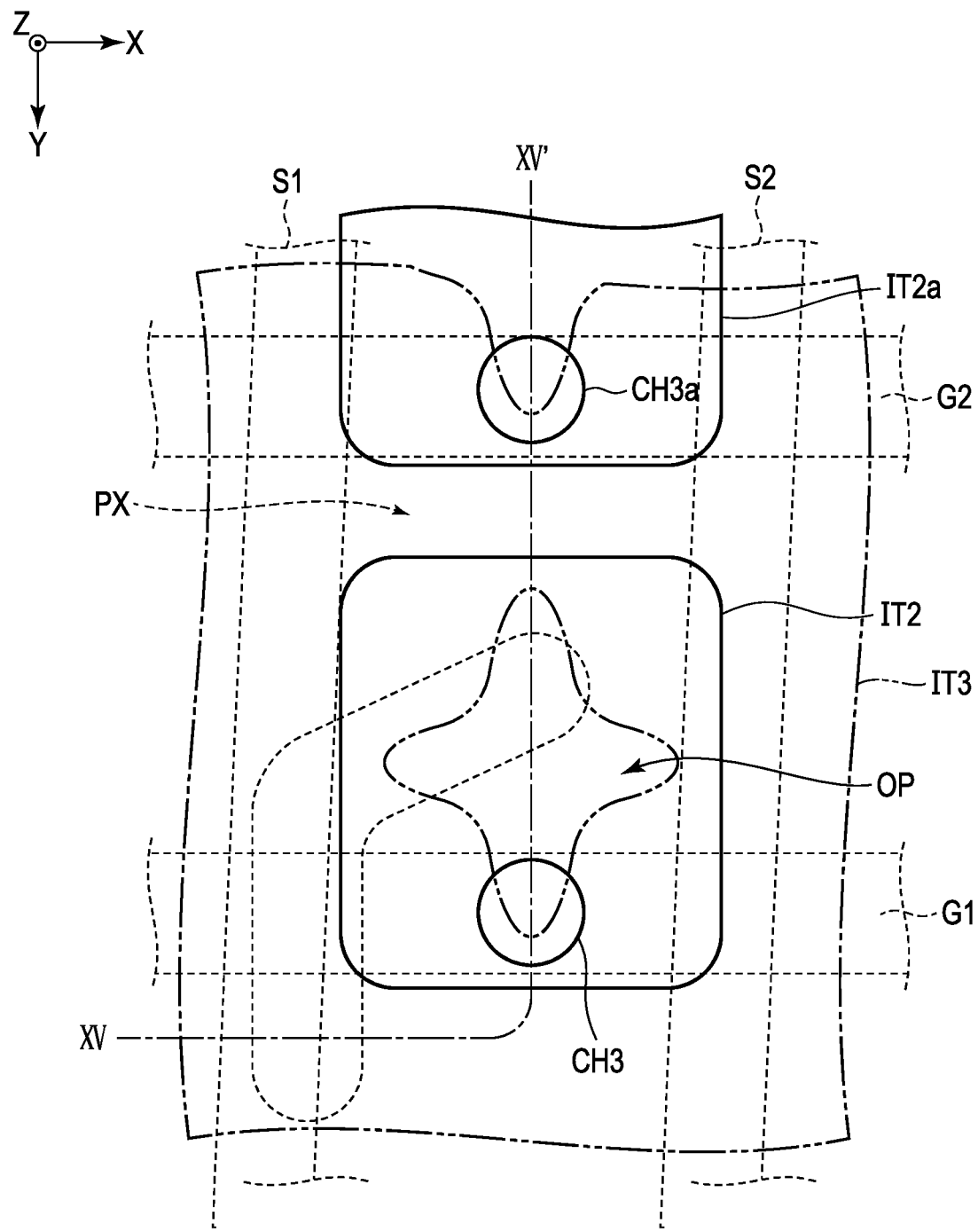
FIG. 13 is a plan view schematically showing a pixel region of a comparative example.

FIG. 13 is a plan view schematically showing the pixel region PX of the comparative example. The comparative example shown in FIG. 13 is different from the embodiments with respect to a feature that the contact hole CH3 is provided outside the pixel region PX. For example, the contact hole CH3 is overlaid on the scanning line G1. In addition, FIG. 13 shows a contact hole CH3a overlaid on the scanning line G2, and a second transparent electrode IT2a overlaid on the contact hole CH3a.

The second transparent electrode IT2 is overlaid on the contact hole CH3 and extends to a pixel region PX adjacent in the second direction Y over the scanning line G1. In contrast, the second transparent electrode IT2 is not overlaid on the scanning line G2. This is because the second transparent electrode IT2 needs to be separated from the second transparent electrode IT2a to electrically insulate from the second transparent electrode IT2a overlaid on the contact hole CH3a. Therefore, a gap is formed between the regions which are not covered with the second transparent electrode IT2, i.e., the second transparent electrode IT2 and the second transparent electrode IT2a, in the pixel region PX.

The third transparent electrode IT3 includes the opening OP in the region where the second transparent electrode IT2 is provided. Therefore, the opening OP is overlaid on the scanning line G1 and is partially overlaid on the contact hole CH3.

Figure 14:
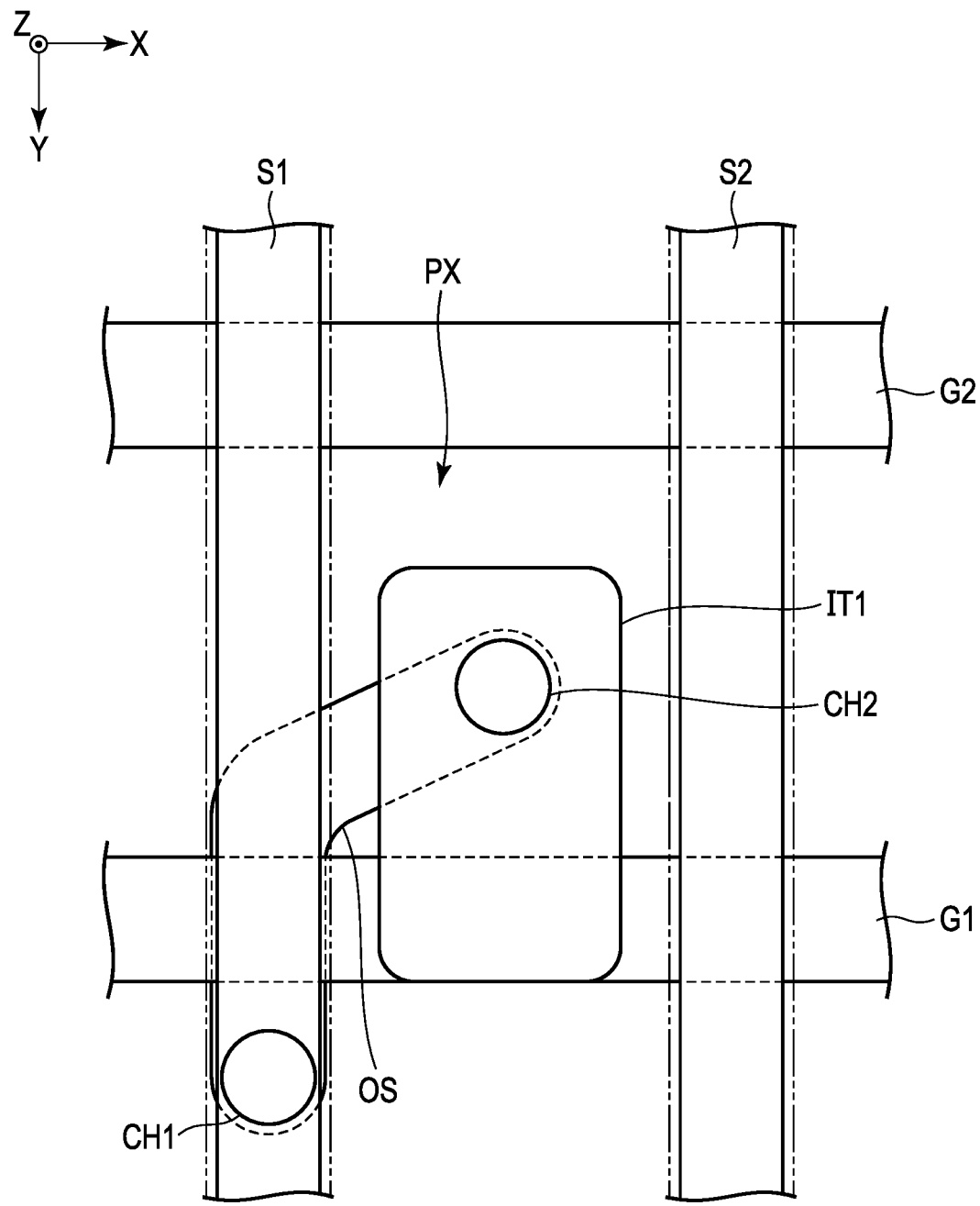
FIG. 14 is a plan view schematically showing a first transparent electrode in the comparative example.

FIG. 14 is a plan view schematically showing the first transparent electrode Il1 in the comparative example shown in FIG. 13. In the comparative example, the first transparent electrode IT1 is also located outside the pixel region PX. That is, the first transparent electrode IT1 extends to the region where the contact hole CH3 is provided, and is overlaid on the scanning line G1.

In addition, the box frame WL is formed in a stripe shape extending in the second direction Y. That is, the box frame WL is not arranged in the region where the contact hole CH3 is provided. More specifically, the box frame WL is provided in the region overlaid on the signal line S1 and the signal line S2, but is not provided between the signal line S1 and the signal line S2.

FIG. 15 is a cross-sectional view taken along line XV-XV' shown in FIG. 13. In the example illustrated, an insulating layer 17 is provided between the insulating layer 16 and the third transparent electrode IT3, in the region where the contact hole CH3 is provided. For example, the insulating layer 17 is formed of an organic insulating material such as polyimide, and the contact holes CH3 and CH3a are filled with the insulating layer 17. The third transparent electrode IT3 is formed on the insulating layer 16 and also extends to the upper part of the insulating layer 17 in the region where the contact holes CH3 and CH3a are provided.

As described above, in the comparative example in which the contact hole CH3 is overlaid on the scanning line G1, the region where the second transparent electrode IT2 is not arranged is set in the pixel region PX to electrically insulate the adjacent second transparent electrode IT2 and second transparent electrode IT2a. In the region where the second transparent electrode IT2 is not arranged, the voltage is hardly applied to the liquid crystal layer LC and the alignment direction of the liquid crystal molecules is hardly changed from the alignment treatment direction AD. That is, the region where the second transparent electrode IT2 is not arranged, of the pixel region PX, is the region where the light emitted from the illumination device BL is hardly transmitted. As a result, the effective area of the pixel region PX (or the effective aperture ratio of the display panel PNL) is reduced and the light transmittance of the display panel PNL is lowered. Such a tendency is particularly significant in the high-definition display panel PNL where the area of the pixel region PX is small.

In contrast, according to the embodiments, the contact hole CH3 for making connection between the first transparent electrode IT1 and the second transparent electrode IT2 is arranged in the center of the pixel region PX. For this reason, the second transparent electrode IT2 and the contact hole CH3 can be overlaid without making the second transparent electrode IT2 extend to an adjacent pixel region PX. In addition, the outer periphery OE2 of the second transparent electrode IT2 is overlaid on the signal lines S and the scanning lines G, which are the boundary of the pixel region PX. That is, the adjacent second transparent electrodes IT2 are not in contact with each other and the second transparent electrodes IT2 are arranged over the entire pixel regions PX. As a result, the entire pixel regions PX can be utilized and the effective aperture ratio of the display panel PNL can be improved. The light transmittance of the display panel PNL can be therefore improved.

In addition, since the contact hole CH3 is located in the pixel region PX, the box frame WL which functions as a spacer can be formed in the region overlaid on both the signal lines S and the scanning lines G. In addition, since the box frame WL is provided in a grating shape, the side surfaces WS of the box frame WL are formed on the entire periphery of the pixel region PX. As a result, the area of the second transparent electrode IT2, the insulating layer 16, and the third transparent electrode IT3 overlaid on the side surfaces WS can be increased as compared with a case where, for example, the box frame WL is formed on the only region overlaid on the signal lines S. Therefore, even in a case where the area of the pixel region PX is reduced because of higher definition, a sufficient storage capacitance can be secured without increasing the number of layers of the electrodes and the insulating layers.

Furthermore, the third transparent electrode IT3 includes the opening OP in the center of the pixel region PX. By using the fringing field formed near the edge E3 of the opening OP and the anchoring force on the side surfaces WS of the box frame WL, the alignment variation, particularly, splay deformation can be generated on the liquid crystal layer LC even in a case where the single second transparent electrode IT2 is arranged in the pixel region PX. That is, the splay deformation of the liquid crystal molecules can be generated and the high-speed response can be implemented without arranging a plurality of second transparent electrodes IT2 in the pixel region PX.

In addition, the width of the opening OP becomes greater toward the contact hole CH3. For example, the sides SO11 and SO12, and the sides SO21 and SO22 constituting the edge E3 of the opening OP are inclined to the alignment treatment direction AD. According to such a configuration, since the direction of the fringing field crosses the alignment treatment direction AD at an angle other than right angles, the rotation direction of the liquid crystal molecules located near the sides SO11, SO12, SO21, and SO22 can be substantially fixed uniquely. The stability in alignment of the liquid crystal molecules can be therefore secured.

In addition, since the opening OP is substantially shaped in a cross symmetric with respect to the first direction X and the second direction Y, the liquid crystal domain formed by the fringing field is also distributed symmetrically in the first direction X and the second direction Y. The dark line region DR generated by the liquid crystal variation of the opposite directions being antagonistic substantially extends to the center of the pixel region PX and is overlaid on the entire contact hole CH3. In general, since control of the liquid crystal molecules in the vicinity of the contact hole, degradation of the color purity easily occurs. According to the embodiment, however, since the dark line region DR covers the contact hole CH3, degradation of the color purity caused by the contact hole CH3 can be suppressed without providing a light-shielding layer.

Next, a modified example of the embodiments will be described with reference to FIGS. 16 to 21.

Figure 16:
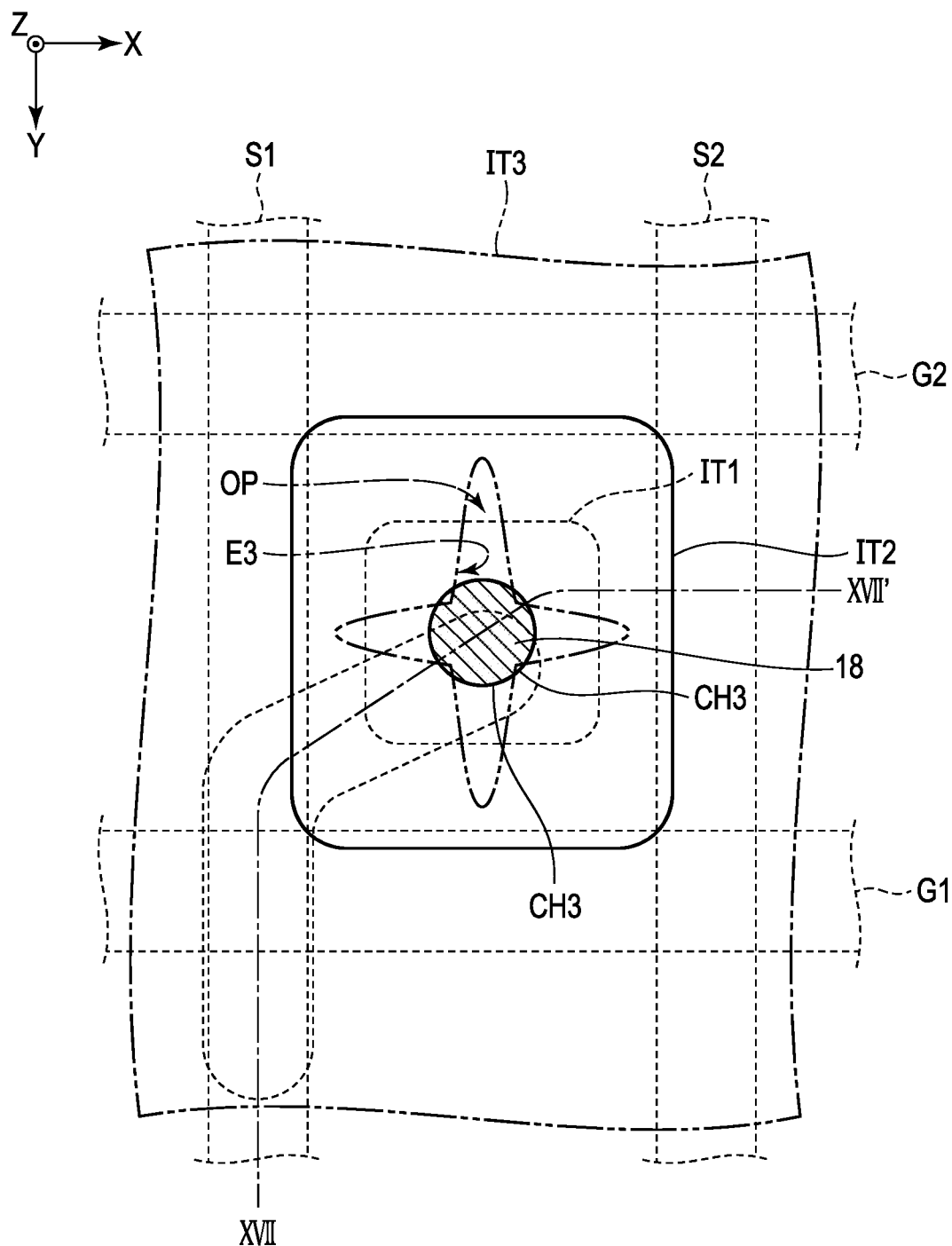
FIG. 16 is a plan view showing a first modified example of the embodiments.

FIG. 16 is a plan view showing a first modified example of the embodiments. The first modified example is different from the example shown in FIG. 4 with respect to a feature that the insulating layer 18 is formed in the region where the contact hole CH3 is provided, as illustrated by the hatch lines in the drawing. In addition, the edge E3 of the opening OP of the third transparent electrode IT3 is partially overlaid on the contact hole CH3. In other words, the third transparent electrode IT3 is partially overlaid on the insulating layer 18.

Figure 17:
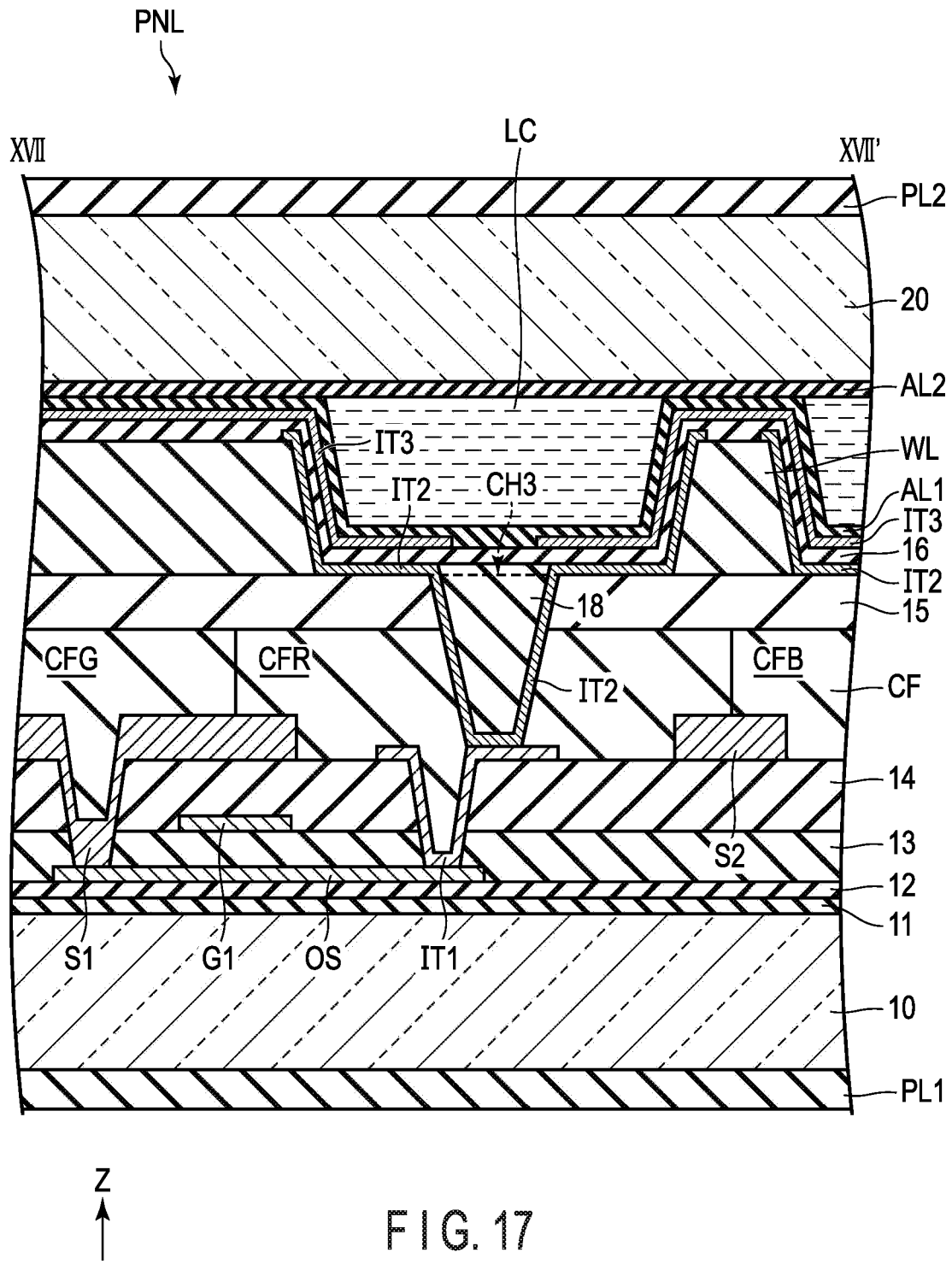
FIG. 17 is a cross-sectional view taken along line XVII-XVII' shown in FIG. 16.

FIG. 17 is a cross-sectional view taken along line XVII-XVII' shown in FIG. 16. The insulating layer 18 is provided between the first transparent electrode IT1 and the insulating layer 16, in the region where the contact hole CH3 is formed. The insulating layer 18 is, for example, an organic insulating layer colored in black. By embedding the contact hole CH3 in the insulating layer 18, the insulating layer 16 is formed to be substantially flat even in the vicinity of the contact hole CH3. As a result, the third transparent electrode IT3 formed on the insulating layer 16 extends to the region overlaid on the contact hole CH3.

Figure 18:
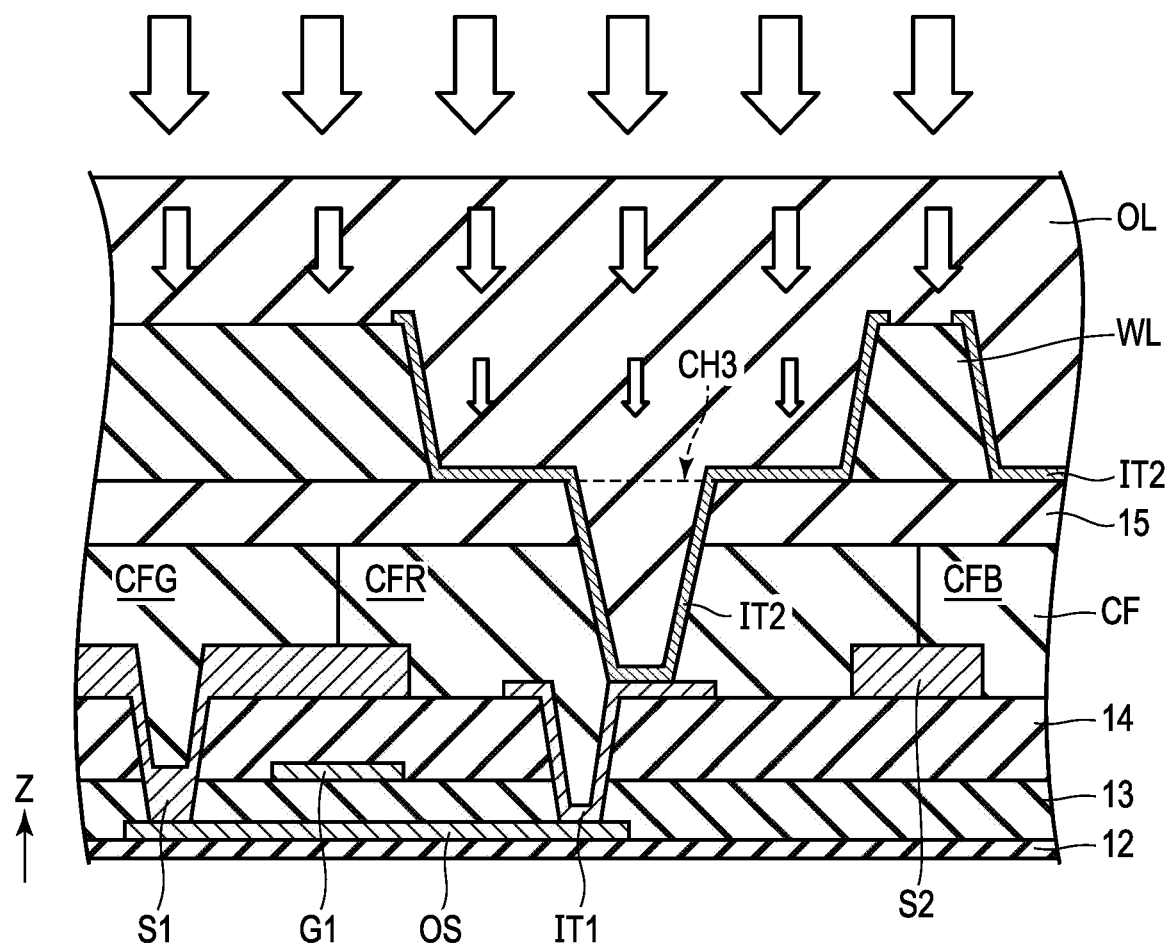
FIG. 18 is a cross-sectional view showing an example of a process relating to formation of an insulating layer shown in FIG. 17.

FIG. 18 is a cross-sectional view showing an example of a process relating to formation of the insulating layer 18 shown in FIG. 17. FIG. 18 shows a state in which the second transparent electrode IT2 has been formed.

First, positive photoresist mixed with pigment is applied to the entire surface of the first substrate SU1. The pigment may be black pigment or a mixture of red pigment, green pigment, and blue pigment. The photoresist is provided in the contact hole CH3.

Next, the photoresist is exposed. At this time, light hardly reaches the inside of the contact hole CH3 as represented by arrows in the drawing. Therefore, the photoresist provided in the contact hole CH3 is not exposed to the light, but remains in the contact hole CH3 after development. As a result, the insulating layer 18 filling the contact hole CH3 is formed.

In the first modified example, too, the same advantages as those of the example shown in FIG. 4 can be obtained. Furthermore, according to the first modified example, degradation of the color purity can be further suppressed since the contact hole CH3 is filled with the black insulating layer 18.

In addition, the insulating layer 16 is planarized though provided in the vicinity of the contact hole CH3. Patterning of the third transparent electrode IT3 formed on the insulating layer 16 can easily be therefore facilitated. That is, the thickness of the photoresist applied onto the third transparent electrode IT3 becomes uniform, in the vicinity of the contact hole CH3, when the opening OP is formed. As a result, the opening OP where the edge E3 is overlaid on the contact hole CH3 can be formed.

Figure 19:
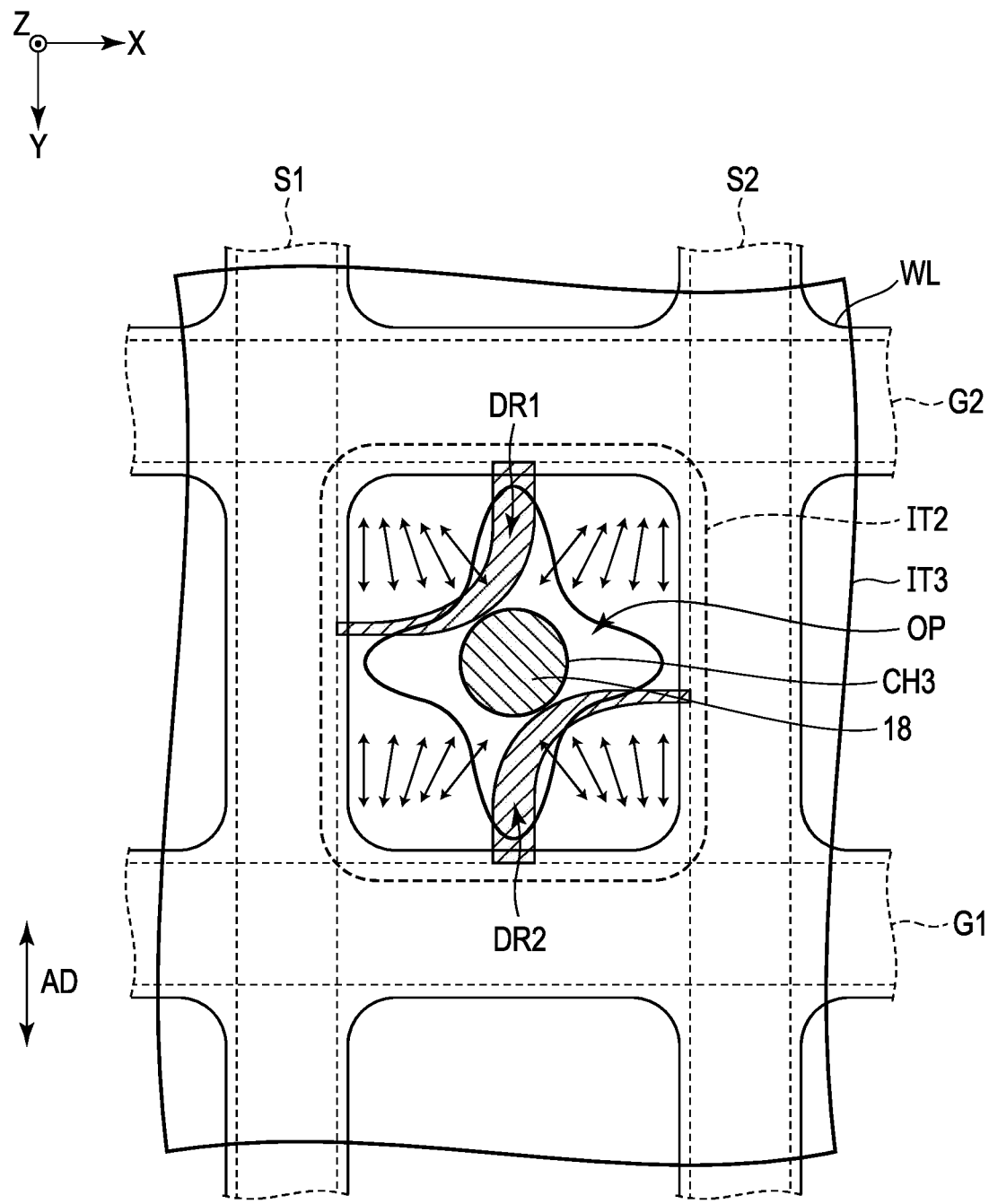
FIG. 19 is a plan view showing a second modified example of the embodiments.

FIG. 19 is a plan view showing a second modified example of the embodiments. The second modified example is different from the example shown in FIG. 9 with respect to a feature that two dark line regions DR1 and DR2 are formed. The dark line regions DR1 and DR2 are shaped in an arc and appear at upper left and lower right parts of the pixel region PX in the example shown in the drawing. The dark line regions DR1 and DR2 are implemented by adding a chiral agent to the liquid crystal layer LC.

That is, the twisting alignment of one direction, of two twisting alignments of the liquid crystal molecules, is facilitated by adding the chiral agent and the region where the twisting alignment is generated is expanded. In contrast, the region where the twisting alignment of the opposite direction is generated is reduced. As a result, the dark line regions DR1 and DR2 shown in FIG. 19 are formed. Incidentally, in the second modified example, too, the contact hole CH3 is filled with the insulating layer 18 colored in black, similarly to the first modified example. Therefore, degradation of the color purity can be prevented even when the contact hole CH3 is not covered with the dark line regions DR1 and DR2.

In the second modified example, too, the same advantages as those of the example shown in FIG. 9 can be obtained. Furthermore, according to the second modified example, the area of the dark line regions DR1 and DR2 can be remarkably reduced. As a result, the light transmittance of the display panel PNL can be further improved.

Figure 20:
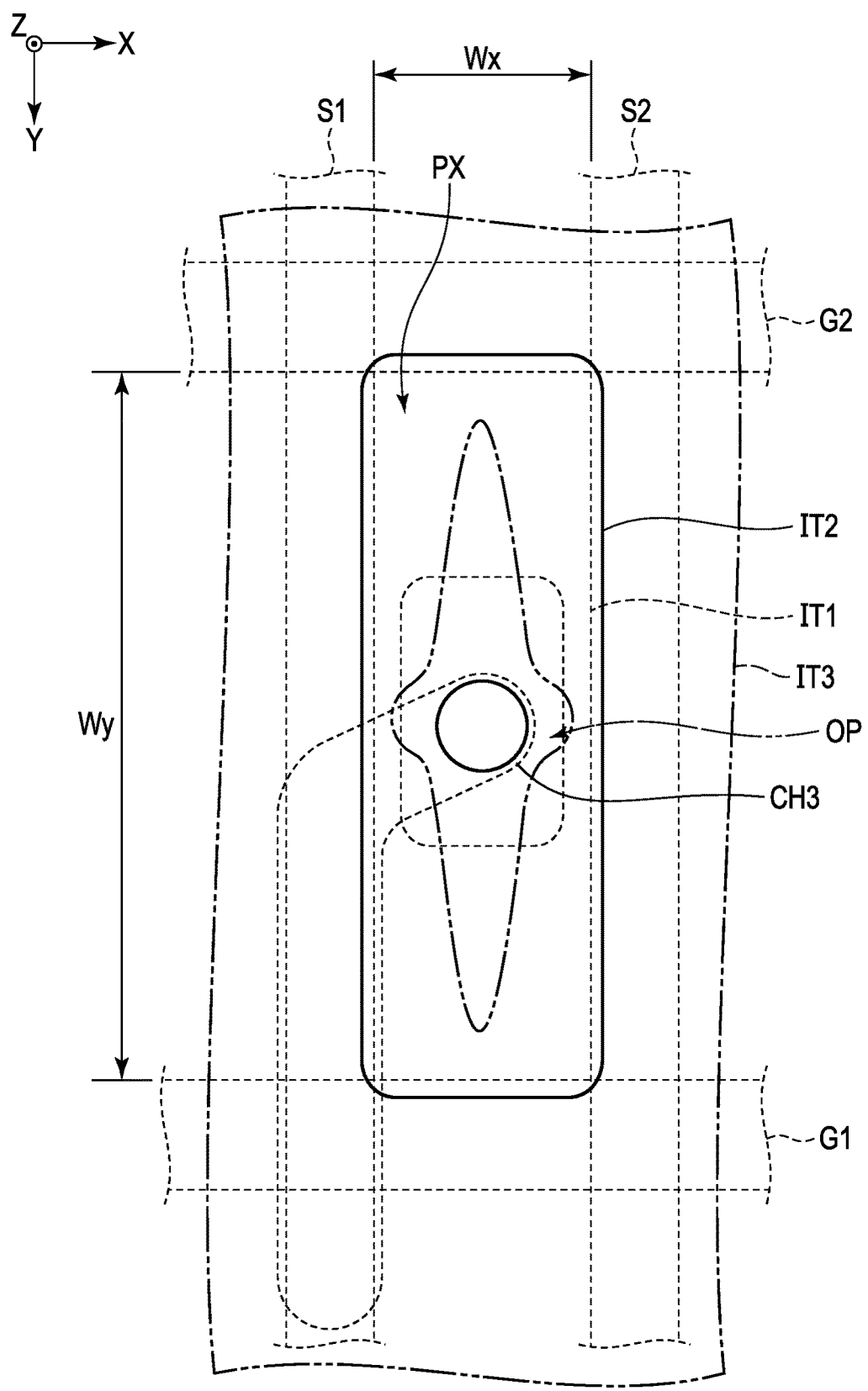
FIG. 20 is a plan view showing a third modified example of the embodiments.

FIG. 20 is a plan view showing a third modified example of the embodiments. The third modified example is different from the example shown in FIG. 4 with respect to a feature that a ratio Wx:Wy of the width Wx in the first direction X to the width Wy in the second direction Y in the pixel region PX is 1:3.

Figure 21:
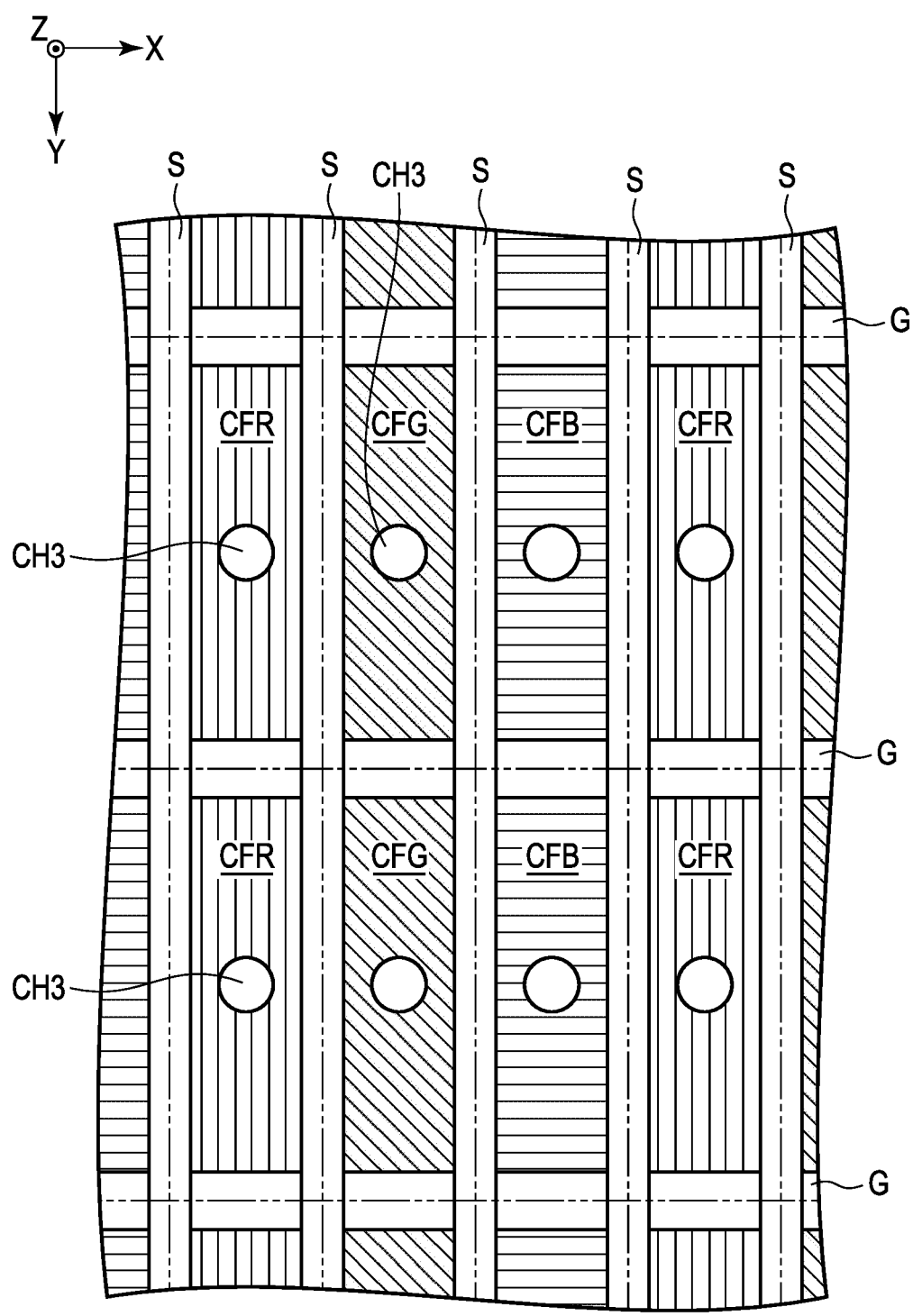
FIG. 21 is a plan view schematically showing an arrangement example of a color filter in the third modified example.

FIG. 21 is a plan view schematically showing an arrangement example of the color filters CFR, CFG, and CFB in the third modified example. The color filters CFR, CFG, and CFB are arranged in this order in the first direction X. In contrast, the color filters of the same color are arranged in the second direction Y. That is, the color filters CFR, CFB, and CFG are arranged in the second direction Y.

In the third modified example, too, the first transparent electrode IT1 and the contact hole CH3 are located in the center of the pixel region PX, and the second transparent electrode IT2 is overlaid on the entire pixel region PX. In addition, the opening OP of the third transparent electrode IT3 is substantially shaped in a cross symmetrical with respect to the first direction X and the second direction Y and is located in the center of the pixel region PX. In the third modified example, too, the same advantages as those of the example shown in FIG. 4 can be obtained.

As described above, according to the embodiments, a display device capable of improving the display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device, comprising:
a first substrate;
a second substrate opposed to the first substrate; and
a liquid crystal layer provided between the first substrate and the second substrate,
the first substrate comprising:
a first signal line and a second signal line formed of a first metal material and being adjacent to each other in a first direction;
a first scanning line and a second scanning line formed of a second metal material and being adjacent to each other in a second direction intersecting the first direction;
a semiconductor layer electrically connected to the first signal line and the first scanning line;
a first transparent electrode in contact with the semiconductor layer;
an organic insulating layer including a contact hole penetrating to the first transparent electrode;
a second transparent electrode in contact with the first transparent electrode through the contact hole;
a third transparent electrode overlaid on the second transparent electrode;
a box frame formed on the organic insulating layer and including a side surface; and
an inorganic insulating layer located between the second transparent electrode and the third transparent electrode,
the first transparent electrode being located in a center of a pixel region surrounded by the first signal line, the second signal line, the first scanning line, and the second scanning line in planar view,
the third transparent electrode including an opening located in the pixel region,
the box frame being overlaid on the first signal line, the second signal line, the first scanning line, and the second scanning line,
the second transparent electrode, the inorganic insulating layer, and the third transparent electrode being overlaid on the side surface, and
the contact hole not being overlaid on the first metal material and the second metal material.

2. The display device of claim 1, wherein
the contact hole is located in the center of the pixel region in planar view.

3. The display device of claim 1, wherein
an outer periphery of the second transparent electrode is overlaid on the first signal line, the second signal line, the first scanning line, and the second scanning line.

4. The display device of claim 1, wherein
the first transparent electrode includes a first region overlaid on the second transparent electrode and not overlaid on the third transparent electrode, and four second regions overlaid on the second transparent electrode and the third transparent electrode, and
the second regions being separated from each other.

5. The display device of claim 4, wherein
the second transparent electrode includes four third regions not overlaid on the first transparent electrode and the third transparent electrode, and
the third regions are separated from each other and each of the third regions is adjacent to the first region.

6. The display device of claim 5, wherein
a width of the first region is greater than a width of the third region.

7. The display device of claim 1, wherein
the first substrate further comprises a resin layer overlaid on the contact hole and provided between the second transparent electrode and the inorganic insulating layer.

8. The display device of claim 7, wherein
the resin layer is black.

9. The display device of claim 1, wherein
the first substrate is in contact with the second substrate in a region where the box frame is provided.

10. The display device of claim 1, wherein
the first transparent electrode, the first signal line, and the second signal line are formed in a same layer.

11. The display device of claim 1, wherein
the organic insulating layer includes a color filter and a transparent planarizing layer covering the color filter.

12. The display device of claim 1, wherein
the semiconductor layer is an oxide semiconductor.

13. The display device of claim 1, wherein
the liquid crystal layer contains a chiral agent.

14. A display device, comprising:
a semiconductor layer;
a first transparent electrode in contact with the semiconductor layer;
a second transparent electrode in contact with the first transparent electrode; and
a third transparent electrode overlaid on the first transparent electrode and the second transparent electrode, the first transparent electrode including a first region overlaid on the second transparent electrode and not overlaid on the third transparent electrode, and four second regions overlaid on the second transparent electrode and the third transparent electrode, the second regions being separated from each other, the second transparent electrode including four third regions not overlaid on the first transparent electrode and the second transparent electrode, and the third regions being separated from each other and each of the third regions is adjacent to the first region.

15. The display device of claim 14, wherein the second transparent electrode includes a fourth region overlaid on the third transparent electrode and not overlaid on the first transparent electrode, and the fourth region surrounds the first region, the second region, and the third region.

16. A display device, comprising:

a semiconductor layer;

a first transparent electrode in contact with the semiconductor layer;

a second transparent electrode in contact with the first transparent electrode; and a third transparent electrode overlaid on the first transparent electrode and the second transparent electrode, the third transparent electrode including an opening, an outer periphery of the first transparent electrode intersecting an edge of the opening at eight points.

\* \* \* \* \*